United States Patent
Shouen

(10) Patent No.: US 7,725,430 B2
(45) Date of Patent: May 25, 2010

(54) HIGH-SPEED INFORMATION PROCESSING BY COORDINATION OF INFORMATION PROCESSING RESOURCES APPARATUS, INCLUDING METHOD, AND COMPUTER-READABLE RECORDING MEDIUM THEREOF

(75) Inventor: Akihisa Shouen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 11/090,274

(22) Filed: Mar. 28, 2005

(65) Prior Publication Data

US 2006/0155799 A1 Jul. 13, 2006

(30) Foreign Application Priority Data

Dec. 28, 2004 (JP) ............................. 2004-382116

(51) Int. Cl.
G06F 17/30 (2006.01)
(52) U.S. Cl. ...................... 707/602; 707/736; 707/803; 707/809
(58) Field of Classification Search .................. 707/10, 707/101, 602, 809; 709/201
See application file for complete search history.

(56) References Cited

U.S. PATENT DOCUMENTS

| 6,073,180 | A * | 6/2000 | Onoda et al. ................ 709/234 |
| 7,188,282 | B2 * | 3/2007 | Walmsley ................... 714/718 |
| 2002/0013832 | A1 | 1/2002 | Hubbard |
| 2002/0019864 | A1 | 2/2002 | Mayer |
| 2004/0194061 | A1 | 9/2004 | Fujino |
| 2004/0215829 | A1 * | 10/2004 | Hubbard et al. ............. 709/246 |
| 2005/0276329 | A1 * | 12/2005 | Adiletta et al. ......... 375/240.16 |
| 2005/0278708 | A1 * | 12/2005 | Zhao et al. .................. 717/136 |
| 2006/0080389 | A1 * | 4/2006 | Powers et al. ............... 709/203 |
| 2006/0195508 | A1 * | 8/2006 | Bernardin et al. ........... 709/203 |
| 2008/0256546 | A1 | 10/2008 | Fujino |

FOREIGN PATENT DOCUMENTS

| JP | 05-46571 A | 2/1993 |
| JP | 2001-195438 | 7/2001 |
| JP | 2001-209622 A | 8/2001 |

(Continued)

OTHER PUBLICATIONS

"Large Study of 'Autonomic Computing' Part 1, From Background Problems in the Future, Check 'Current Position' of Autonomic Computing", ComputerWorld, IDG Japan Ltd., Jan. 1, 2004, vol. 1, No. 1, pp. 72-78, issued Jan. 1, 2004—pp. 76-77, "Technology for Virtualization of Autonomic Computing" and Fig 3.

(Continued)

Primary Examiner—Shahid A Alam
Assistant Examiner—Alexandria Y Bromell
(74) Attorney, Agent, or Firm—Staas & Halsey LLP

(57) ABSTRACT

This invention relates to information processing such as coordination of distributed information processing resources, and makes collaboration of distributed information processing resources easy and improves convenience of information processing. A high-speed information processing apparatus according to the present invention includes a conversion processing section operable to model a plurality of distributed information processing resources through definition of the plurality of information processing resources by attributes thereof and to assign a collaborative relationship to modeled information processing resources obtained through the modeling.

16 Claims, 37 Drawing Sheets

FOREIGN PATENT DOCUMENTS

| | | |
|---|---|---|
| JP | 2001-209622 A | 8/2001 |
| JP | 2002-140277 | 5/2002 |
| JP | 2002-269330 | 9/2002 |
| JP | 2003-280928 A | 10/2003 |
| JP | 2004-513406 | 4/2004 |
| JP | 05-46571 A | 9/2004 |
| JP | 2004-302937 | 10/2004 |
| WO | 97/33227 | 9/1997 |
| WO | WO 97/33227 | 9/1997 |
| WO | WO-01/73545 A3 | 10/2001 |
| WO | WO 01/73545 A3 | 10/2001 |

OTHER PUBLICATIONS

Japanese Office Action for Japanese Patent Application No. 2004-382116, Sep. 8, 2009, Corresponding to U.S. Appl. No. 11/090,274.

"Large Study of 'Autonomic Computing', Part 1, From Background of Its Appearance to Problems in the Future, Check 'Current Position' of Autonomic Computing", ComputerWorld, IDG Japan Ltd., Jan. 1, 2004, vol. 1, No. 1, pp. 72-78, Jan. 1, 2004, pp. 76-77, "Technology for Virtualization of Autonomic Computing" and Fig. 3. Refer to the Office Action issued in corresponding Japanese Patent Application No. 2004-382116.

Japanese Office Action in corresponding Japanese Patent Application No. 2004-382116, issue date Sep. 8, 2009.

WATASE, Jumpei and the other three, *A Study on Adaptive Data Center System*, IEICE Technical Report, The Institute of Electronics, Information and Communication Engineers, Jan. 9, 2003, vol. 102, No. 560, pp. 7-12 (JP-N6-08-023253) (8 pages) English translation of relative portions (2 pages).

Japanese Office Action dated Dec. 15, 2009 issued in corresponding Japanese Patent Application No. 2004-382116 (3 pages) English translation of relative portions (3 pages).

* cited by examiner

FIG.17

| DEFINITION COMMAND | DEFINITION NAME | ATTRIBUTE |
|---|---|---|
| (1) FILE RESOURCE DEFINITION | : fdef | FILE DEFINITION NAME = FILE SERVER IP ADDRESS/UNIQUE FILE NAME; |
| (2) MIRROR FILE DEFINITION | : mrdef | CORRESPONDING FILE NAME DEFINITION NAME 1 = CORRESPONDING FILE NAME DEFINITION NAME 2 [, ...]; |
| (3) PROCESSING RESOURCE DEFINITION | : pdef | PROCESSING DEFINITION NAME = UNIQUE PROGRAM NAME [, ...]; |
| (4) PROCESSING HIERARCHY DEFINITION | : hidef | PROCESSING HIERARCHY NAME { PROCESSING DEFINITION NAME 1 [, ...]; LOWER-LEVEL PROCESSING HIERARCHY DEFINITION NAME 1 [, ...]; } |
| (5) PROCESSING DEFINITION | | IF (CONDITION) STATEMENT1; [ELSE STATEMENT2;] <br> FOR (INITIALIZATION; CONDITION; INCREASE/DECREASE) STATEMENT; <br> WHILE (CONDITION) {STATEMENT;} <br> DO {STATEMENT} <br> CANCEL; BREAK; |

[ ] ···· OMITTED
{ } ···· SELECTED

FIG.18

EXAMPLE OF PROCESSING DESCRIPTION :

| | | |
|---|---|---|
| COLLABORATION FILE DEFINITION | : fdef | FA1= '12.34.56.78/ABC.FILE' ; |
| MIRROR DEFINITION | : mrdef | FA1=Local_A ; |
| TOOL DEFINITION | : pdef | CAD1 = JOB123 , CAD2 = JOB456 ; |
| PROCESSING CONDITION DEFINITION | : if | ( CAD1.STATE <= 9) break ; |

EXAMPLE OF GROUP HIERARCHICAL PROCESSING MODEL DEFINITION :

Hidef HL1 : CAD1 , CAD2 ;
Hidef HL2 : HL1 , CAD3 , CAD4 ;

FIG.30
(A)
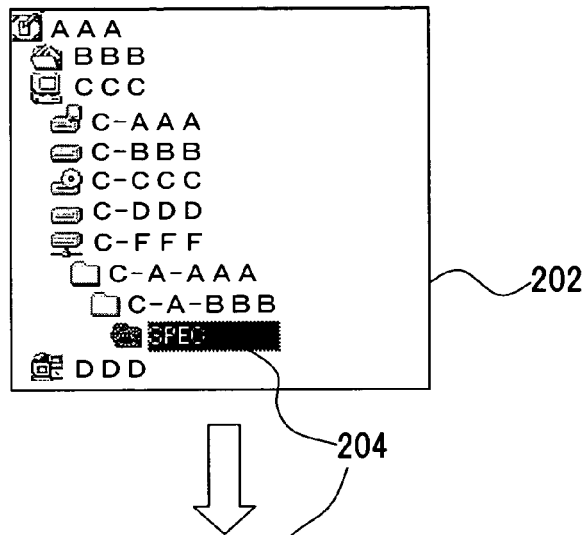
(B)
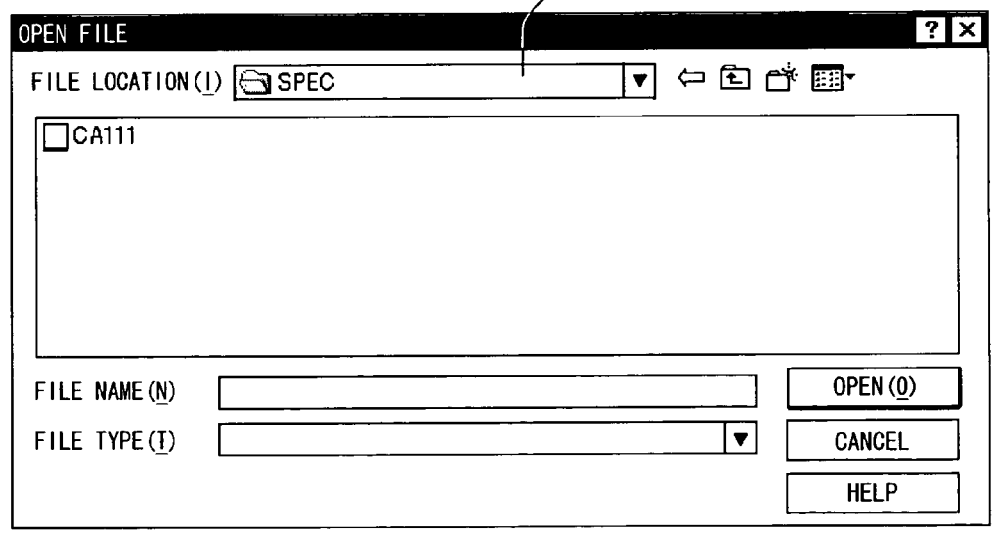

FIG.36

AMOUNT OF TRANSMISSION DATA  32Byte(4×8)

| | | | | |
|---|---|---|---|---|
| 0 | 00 | 00 | 00 | 00 |
| 1 | 00 | 00 | 00 | 00 |
| 2 | FF | FF | FF | FF |
| 3 | 01 | 23 | 45 | 67 |
| 4 | 89 | AB | CD | EF |
| 5 | 89 | AB | CD | 01 |
| 6 | 00 | 00 | 00 | 10 |
| 7 | 00 | 00 | 00 | 11 |

1024
(BUFFER LENGTH)

FIG.37

(A)
CONTROL TABLE (CTLT)

| CONTROL INFORMATION | NUMBER OF CONTINUOUS BYTES (NUMBER OF BYTES) |
|---|---|
| s | 8 |
| s | 4 |
| c | 8 |
| d | 3 |
| 1 | 2 |

- 8-BYTE COMMON
- 4-BYTE COMMON
- 8-BYTE COPY
- TRANSFER OF DIFFERENCE
- VARIABLE BYTE (B)
COMPRESSION RESULT TABLE (CNTT)

| | | | |
|---|---|---|---|
| 00 | | | |
| | | | |
| FF | | | |
| 01 | 23 | 45 | 67 |
| 89 | AB | CD | EF |
| | | | 01 |
| | | | 10 |
| | | | 11 |

HIGH-SPEED INFORMATION PROCESSING BY COORDINATION OF INFORMATION PROCESSING RESOURCES APPARATUS, INCLUDING METHOD, AND COMPUTER-READABLE RECORDING MEDIUM THEREOF

BACKGROUND OF THE INVENTION

1. Field of the Invention

The present invention relates to information processing such as coordination of information processing resources. In particular, the present invention relates to a high-speed information processing apparatus, a high-speed information processing method, and a high-speed information processing program used for information processing, such as collaboration and coordination, of various information processing resources, including CAD (Computer Aided Design) data, existing at remote sites, e.g., another continent, through the modeling and systematization of the information processing resources.

More particularly, the present invention refers to a series of mechanisms for: growing high-speed central processing, for example, at a large-scale machine center; wide-area parallel collaboration with, for example, servers and clients distributed at a plurality of remote bases; simultaneous high-speed data transfer to a plurality of bases that enables a huge amount of data distributed at such remote bases to be manipulated in a collaborated manner through the same operation as when local data is manipulated; and definition and control of base-to-base application collaboration/parallel operation management. In other words the present invention relates to a business model based on these mechanisms functioning as a hyper framework. Furthermore, the present invention relates to a mechanism for transferring three-dimensional coordinate information, mouse events, etc., to a processing server at high-speed to improve responsiveness in server-side dialog processing in an existing environment, such as responsiveness in the ASP (Application Service Provider) method where an application is located at the center and dialog is performed at a remote client.

2. Description of the Related Art

One of the main goals in product development is to release high-quality products to the market as soon as possible. To achieve this goal, a large-scale, high-quality processing environment, like one realized with a virtual factory, is required. To build such a processing environment, CAD, CAE (Computer Aided Engineering), and CAM (Computer Aided Manufacturing), which realize virtual development, high-speed simulation, and early-stage evaluation of products, are required.

To build a product development environment, it is also necessary to build, for example, an ASP environment which can provide services for achieving high-speed processing of various applications free of temporal, geographical, and scale restorations. To build an environment to carry out high-speed processing of distributed information processing resources, such a collaborative environment is essential that supports collaboration and dialog with remote sites in the same manner and operational feeling as local operation. The realization of such an environment now extends beyond the product development realm to PLM (Product life cycle management) ranging from product development to product disposal. This PLM activity is ultimately expected to help the conservation of the global environment.

The manipulation of processing resources distributed over a known local network will now be described with reference to FIG. 1, which shows the manipulation of processing resources distributed over a known local network.

Information processing centers A, B, C, . . . X functioning as bases constituting a known local network are interconnected via a network 2. The information processing centers A, B, C, . . . X each include many processing resources. More specifically, the information processing center A includes, for example, resources aa, ab, and ac as the information processing resources. If a client 4 is to use, for example, the resources aa, ab, and ac distributed in the information processing center A, a standard access method is used. No problems arise with the data transfer rate, resource operability, and responsiveness for the utilization of resources within a short range, namely, the utilization of information processing resources within the information processing centers A, B, C, . . . X.

An ASP operating procedure for using information resources between information processing centers will now be described with reference to FIG. 2, which shows a processing procedure between information processing centers.

In a known ASP environment, the user's information processing center A includes a computer 6 that performs information processing and a file (ua) 8. The information processing center B includes a counterpart computer 10 and a counterpart file (ub) 12. As described above, the information processing centers A and B are interconnected via the network 2. ASP server processing 14 is performed in the information processing center A. The ASP server processing 14 includes tool selection and Web (World Wide Web) conversion 16, which includes a file system 18, CAD tools 201 and 202, etc. Information transfer processing includes processing 22 of, for example, various FTP (File Transfer Protocol), and the processing 22 requires a plurality of work files 241 and 242.

Operating procedures for the ASP environment will be described below. Procedures (1) to (3) are shown in FIG. 2 to clarify the relationships.

(1) Required file transmission by a plurality of information processing centers

This file transmission includes, for example, file selection, compression, transfer, decompression, etc.

(2) Selection of a required CAD tool, startup of the tool, start of operation by specifying a file (3) Reception and updating of a result file after CAD processing, and exiting the tool Reception of the result file includes file selection, compression, transfer, decompression, etc. and updating includes management of editions, etc.

An Internet-based collaborative design method has been proposed in the form of a system that allows both advisee and adviser to browse and select the latest catalog data free of temporal or geographical restrictions and allows design drawings to be produced in real time (Japanese Unexamined Patent Application Publication No. 2001-195438). In addition, there has been proposed an integrated communication system that provides work files on the Web to allow two parties residing at remote sites from each other to exchange views based on CAD drawings (Japanese Unexamined Patent Application Publication No. 2002-140277). Furthermore, a system that centrally manages distributed data in a common database has been proposed as an example of a system that achieves coordination of information resources (Japanese Unexamined Patent Application Publication No. 2002-269330).

More fast and extent collaboration is required due to a growing amount of processing and consequent demands for high-speed processing and global utilization of resources. With the known access method, however, simultaneous high-speed transfer of data to a plurality of information processing centers is not possible, and consequently practical resource utilization is difficult due to distance and a limited transmission band. With the known access method (FIG. 1), for example, the resources aa and ab, which are limited in their own information processing centers A, B, C, . . . X, are used collaboratively only between one information processing center and another. What is the worse is that the known access method is supposed to transfer only a small amount of data. Moreover, with the known access method, frequently repeated transfer processing cannot be avoided to achieve large-scale collaboration among information processing centers. This repeated transfer processing is time-consuming because it involves pre-processing, post-processing, and transfer operation, making practical operation difficult. Furthermore, individual processing at information processing centers is not efficient.

It is customary that to centrally manage engineering applications, such as large-scale CAD applications, data at clients is transferred to a server, which then carries out high-speed processing, and after the processing, sends back the processed results to the clients. This type of central processing takes a very long time to repeatedly transfer many large files between servers and clients before and after processing, and therefore, is significantly inefficient. Display of results of processing, if it is a long-distance dialog such as a dialog with a site on another continent via the Internet, also suffers from a large loss in transfer time, and a quick response cannot be expected for such processing.

No suggestions or proposals about these problems or about solutions to these problems are found in Japanese Unexamined Patent Application Publication No. 2001-195438, Japanese Unexamined Patent Application Publication No. 2002-140277, or Japanese Unexamined Patent Application Publication No. 2002-269330.

SUMMARY OF THE INVENTION

The present invention relates to information processing such as coordination of distributed information processing resources. An object of the present invention is to facilitate the collaboration of distributed information processing resources to increase the convenience of information processing.

In order to achieve the above-described object, a high-speed information processing apparatus according to the present invention includes a conversion processing section operable to model a plurality of distributed information processing resources through definition of the plurality of information processing resources by attributes thereof and to assign a collaborative relationship to modeled information processing resources obtained through the modeling.

According to the structure, the information processing resources are defined based on their attributes and modeled for integration of the information processing resources. Furthermore, the modeled information processing resources are given a collaborative relationship, which enables the information processing resources to be chained to increase the convenience.

In order to achieve the above-described object, in the high-speed information processing apparatus according to the present invention, the definition may include modeling of basic components of the information processing resources and at least one of grouping, hierarchization, and parallelization of the modeled basic components. With this definition concept, the attributes of the information processing resources are defined, and information processing resources arranged through the definition become more useful.

In order to achieve the above-described object, in the high-speed information processing apparatus according to the present invention, the definition may include definition of processing operation of the modeled information processing resources and the definition of processing operation may include a condition and behavior of the processing operation. With this definition concept, the attributes of the information processing resources are defined, and information processing resources arranged through the definition can be referred to and utilized more easily.

In order to achieve the above-described object, the high-speed information processing apparatus according to the present invention may further include a transfer section operable to transfer the modeled information processing resources to another information processing apparatus. With this structure, the information processing resources can be transferred by the transfer section to increase the transfer rate of the information processing resources.

In order to achieve the above-described object, the high-speed information processing apparatus according to the present invention may further include a transfer section operable to convert a quantization unit of bits of the information processing resources into an optimal variable number of bytes, express the quantization unit as the amount of change in transfer units, and reduce the amount of transfer information in overall processing in the units for transfer.

In order to achieve the above-described object, the high-speed information processing apparatus according to the present invention may further include a display section operable to visually display a processing state of the related information processing resources.

In order to achieve the above-described object, a high-speed information processing method according to the present invention includes: a modeling step of modeling a plurality of distributed information processing resources through definition of the plurality of information processing resources by attributes thereof; and a collaborating step of assigning a collaborative relationship to modeled information processing resources obtained through the modeling.

In order to achieve the above-described object, in the high-speed information processing method according to the present invention, the definition may include modeling of basic components of the information processing resources and at least one of grouping, hierarchization, and parallelization of the modeled basic components.

In order to achieve the above-described object, in the high-speed information processing method according to the present invention, the definition may include definition of processing operation of the modeled information processing resources and the definition of processing operation may include a condition and behavior of the processing operation.

In order to achieve the above-described object, the high-speed information processing method according to the present invention may further include a transfer step of transferring the modeled information processing resources to another information processing apparatus.

In order to achieve the above-described object, the high-speed information processing method according to the present invention may further include a transfer step of converting a quantization unit of bits of the information processing resources into an optimal variable number of bytes, expressing the quantization unit as the amount of change in transfer units, and reducing the amount of transfer information in overall processing in the units for transfer.

In order to, achieve the above-described object, the high-speed information processing method according to the present invention may further include the step of visualizing a processing state of the related information processing resources and converting the processing state into display information.

In order to achieve the above-described object, the high-speed information processing method according to the present invention may further include the step of, if the information processing resources include processing information including three-dimensional event information, decreasing the amount of information based on the amount of change of the information over time.

In order to achieve the above-described object, a computer-executable program for high-speed information processing, according to the present invention, includes: a modeling step of modeling a plurality of distributed information processing resources through definition of the plurality of information processing resources by attributes thereof; and a collaborating step of assigning a collaborative relationship to modeled information processing resources obtained through the modeling.

In order to achieve the above-described object, in the high-speed information processing program according to the present invention, the definition may include modeling of basic components of the information processing resources and at least one of grouping, hierarchization, and parallelization of the modeled basic components.

In order to achieve the above-described object, in the high-speed information processing program according to the present invention, the definition may include definition of processing operation of the modeled information processing resources and the definition of processing operation may include a condition and behavior of the processing operation.

In order to achieve the above-described object, the high-speed information processing program according to the present invention may further include a transfer step of transferring the modeled information processing resources to another information processing apparatus.

In order to achieve the above-described object, a recording medium according to the present invention stores a computer-executable high-speed information processing program. The program includes: a modeling step of modeling a plurality of distributed information processing resources through definition of the plurality of information processing resources by attributes thereof; and a collaborating step of assigning a collaborative relationship to modeled information processing resources obtained through the modeling.

In order to achieve the above-described object, in the recording medium according to the present invention, the definition may include modeling of basic components of the information processing resources and at least one of grouping, hierarchization, and parallelization of the modeled basic components.

In order to achieve the above-described object, in the recording medium according to the present invention, the definition may include definition of processing operation of the modeled information processing resources and the definition of processing operation may include a condition and behavior of the processing operation.

In order to achieve the above-described object, in the recording medium according to the present invention, the high-speed information processing program may further include a transfer step of transferring the modeled information processing resources to another information processing apparatus.

As described above, the present invention relates to information processing such as coordination of information processing resources and promotes coordination of information processing resources distributed at remote sites such as other continents to increase available information processing resources and contribute to convenience such as reduction in control processing load.

Advantages of the present invention are described below.

(1) Information processing, such as coordination of information processing resources distributed at remote sites, e.g., other continents, can be performed at higher speed, available information processing resources are increased, and the convenience of information processing resources is increased.

(2) Collaboration of information processing resources between remote sites can be achieved to effectively and efficiently utilize the information processing resources.

Further objects, features and advantages of the present invention will become apparent from the following description of the preferred embodiments with reference to the attached drawings.

BRIEF DESCRIPTION OF THE DRAWINGS

FIG. 17 is a diagram illustrating an example of resource attribute definition;

FIG. 18 is a diagram depicting a processing description example;

FIG. 30 is a diagram depicting a processing screen.

FIG. 36 is a diagram depicting an example of changed quantization bytes; and

FIG. 37 is a diagram depicting a control table and a compression result table.

DESCRIPTION OF THE PREFERRED EMBODIMENTS

First Embodiment

Figure 3:
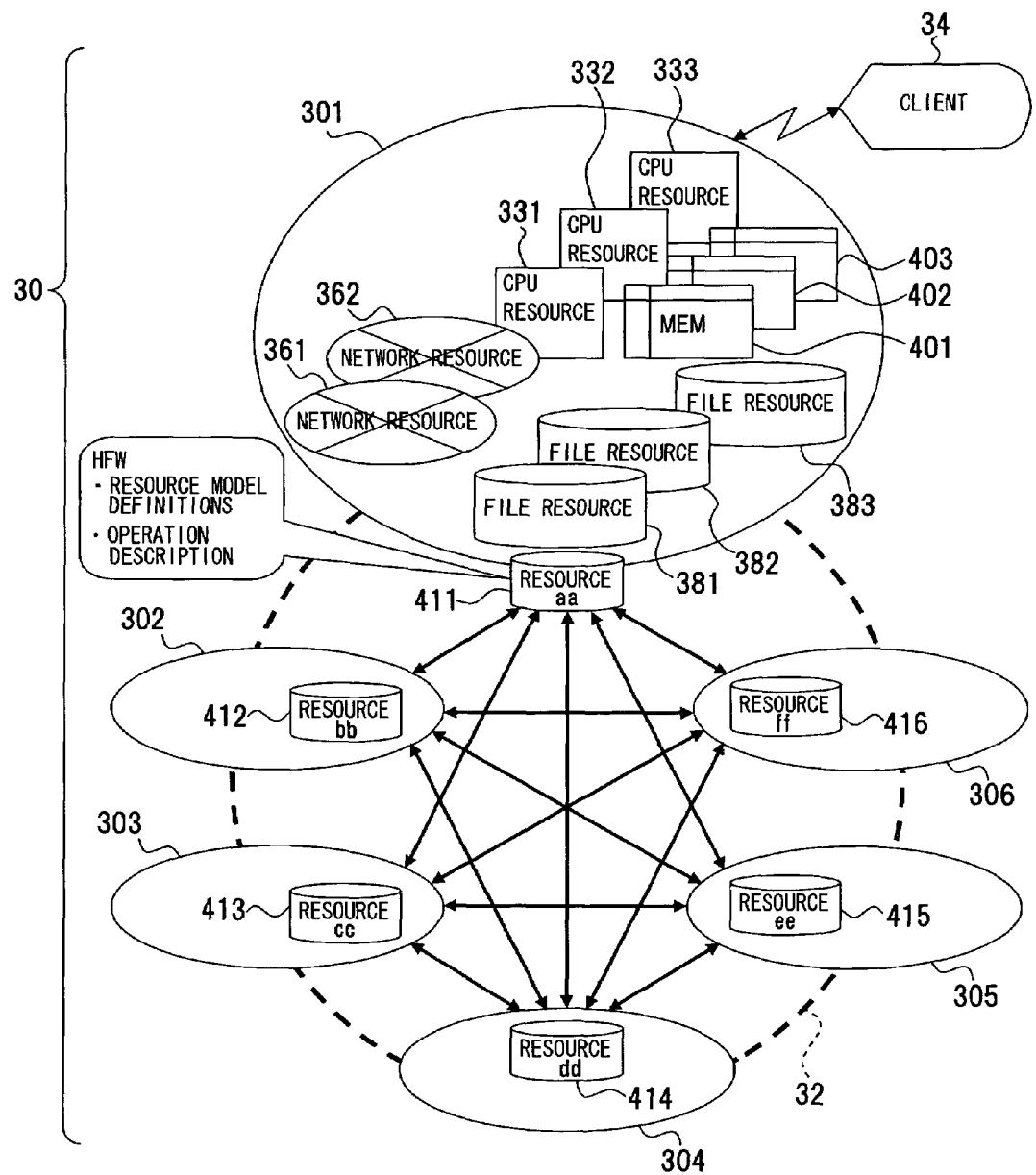
FIG. 3 is a schematic diagram of an information processing system according to a first embodiment of the present invention.

A first embodiment according to the present invention will now be described with reference to FIG. 3, which is a schematic diagram of an information processing system.

An information processing system 30 includes, for example, information processing centers 301, 302, 303, 304, 305, and 306, functioning as bases for a plurality of distributed information processing resources, interconnected to one another via a network 32. This structure establishes an environment for promoting the facilitation of the sharing, collaboration, and coordination of the information processing resources.

The information processing center 301 includes, for example, CPU resources 331, 332, and 333; network resources 361 and 362; file resources 381, 382, and 383, etc as a plurality of information processing resources. The CPU resources 331, 332, and 333 are hardware resources directly responsible for information processing, and include MEMs (Memories) 401, 402, and 403, respectively. More specifically, the CPU resources 331, 332, and 333 constitute a conversion processing section that defines a plurality of distributed information processing resources by attribute for modeling and gives collaborative relationships to the modeled information processing resources obtained through the modeling; and a transfer section that transfers the modeled information processing resources to other information processing apparatuses. The network resources 361 and 362 are resources that link between the CPU resources 331, 332, and 333. The file resources 381, 382, and 383 are resources that store information and are also information as resources. The information processing center 301 is linked with a client 34 for exchanging information. The information processing centers 302 to 306 also include the same resources as those in the information processing center 301.

The information processing centers 301, 302, 303, 304, 305, and 306 further include a resource aa 411, a resource bb 412, a resource cc 413, a resource dd 414, a resource ee 415, and a resource ff 416, respectively. They are hyper frameworks (HFWs) as file resources that link among the information processing centers 301, 302, 303, 304, 305, and 306. The HFWs refer to a concept and a method for applying modeling and visualization to the resources 411 to 416 of the information processing centers 301 to 306 distributed over a wide area (global area), facilitating the sharing, collaboration, and coordination of the resources 411 to 416 among the remote information processing centers 301, 302, 303, 304, 305, and 306 through the definition of behavior of the models, and promoting such facilitation of the sharing, collaboration, and coordination. The term "modeling" represents to formalize information processing resources. Examples of the processing by the HFWs are described below.

(1) Modeling information processing resources (hardware, software tools, network environments)

(2) Visualizing model-defined resources (3) Defining the operation of resources and their working (behavior and results)

Figure 4:
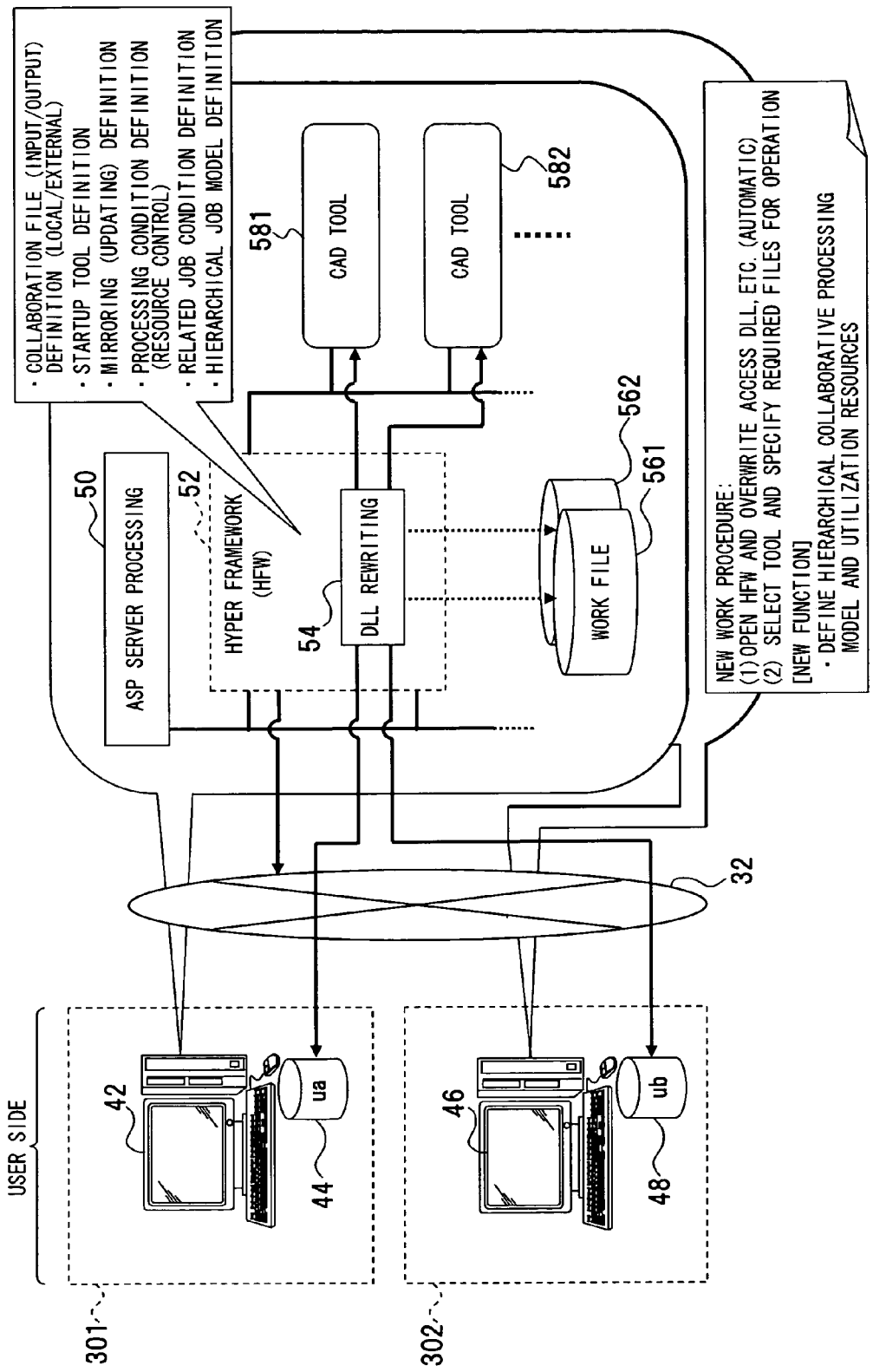
FIG. 4 is a diagram depicting one example of information processing between information processing centers according to the first embodiment of the present invention.
Figure 5:
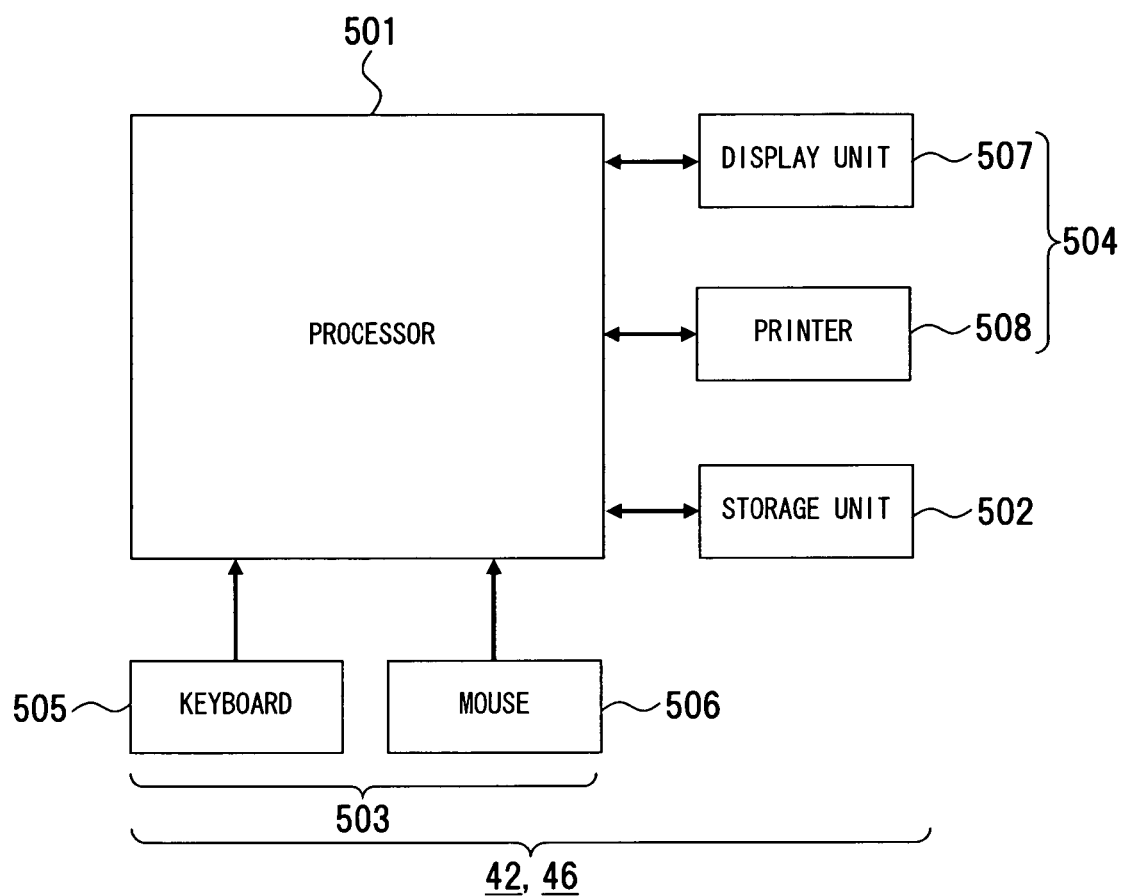
FIG. 5 is a schematic diagram depicting a computer according to the first embodiment of the present invention.

(4) Establishing an environment (high-speed communication infrastructure) for information collaboration/coordination Information processing between information processing centers will now be described with reference to FIGS. 4 and 5. FIG. 4 is a diagram depicting one example of information processing between information processing centers, and FIG. 5 is a schematic diagram depicting a computer.

An example of the present high-speed information processing method and program is given below. Referring to FIG. 4, the information processing center 301, serving as a user-end base, includes a computer 42 and a file 44. Similarly, the information processing center 302 includes a computer 46 and a file 48. Referring to FIG. 5, each of the computers 42 and 46 includes, for example, a processor 501 that carries out information processing such as arithmetic operations; a storage unit 502 as a recording medium for storing programs and data; an input unit 503 used to enter data; and an output unit 504 used for data output and presentation. A keyboard 505 and a mouse 506 are installed as the input unit 503. A display unit 507 and a printer 508 are installed as the output unit 504 for presenting information. The input unit 503 may be constructed so as to be integrated with the display unit 507. The above-described recording medium is a recording medium storing computer-readable programs and data, and may include various storage device such as a CD-ROM and a semiconductor memory in addition to the storage unit 502.

Figure 1:
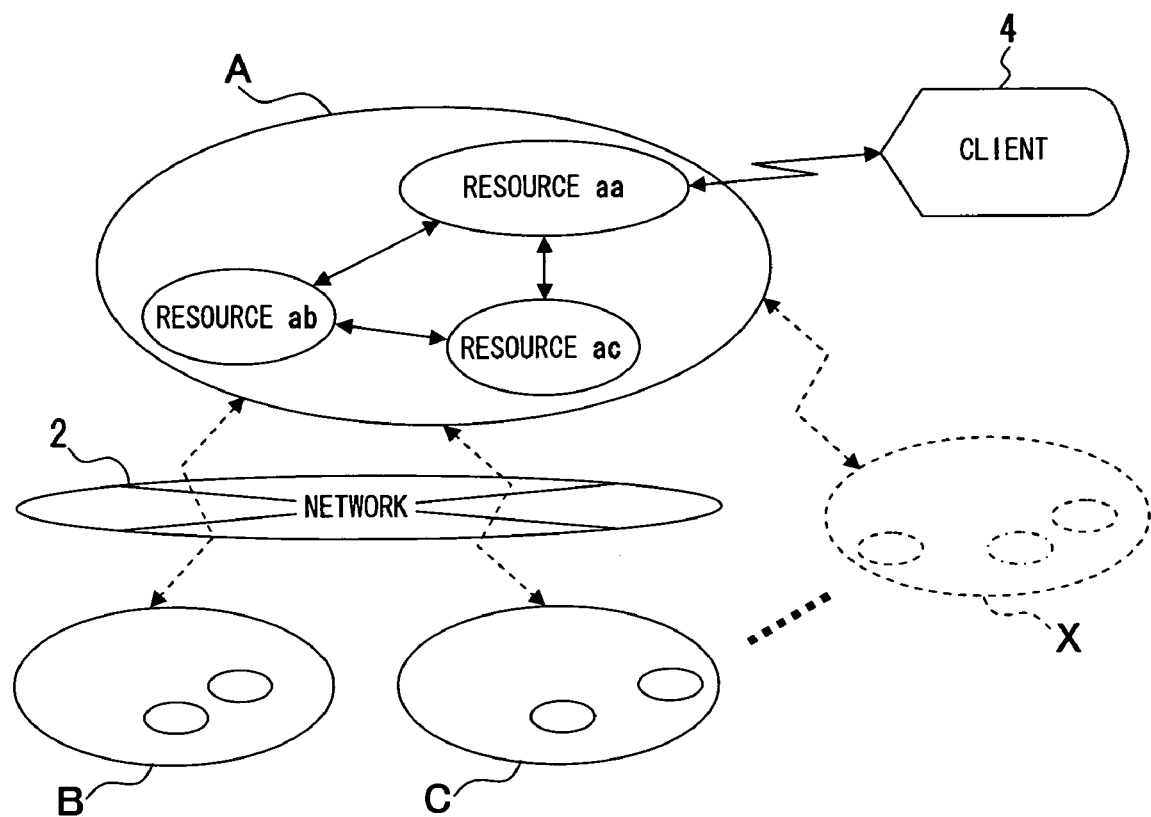
FIG. 1 shows the manipulation of information processing resources distributed over a local network.
Figure 2:
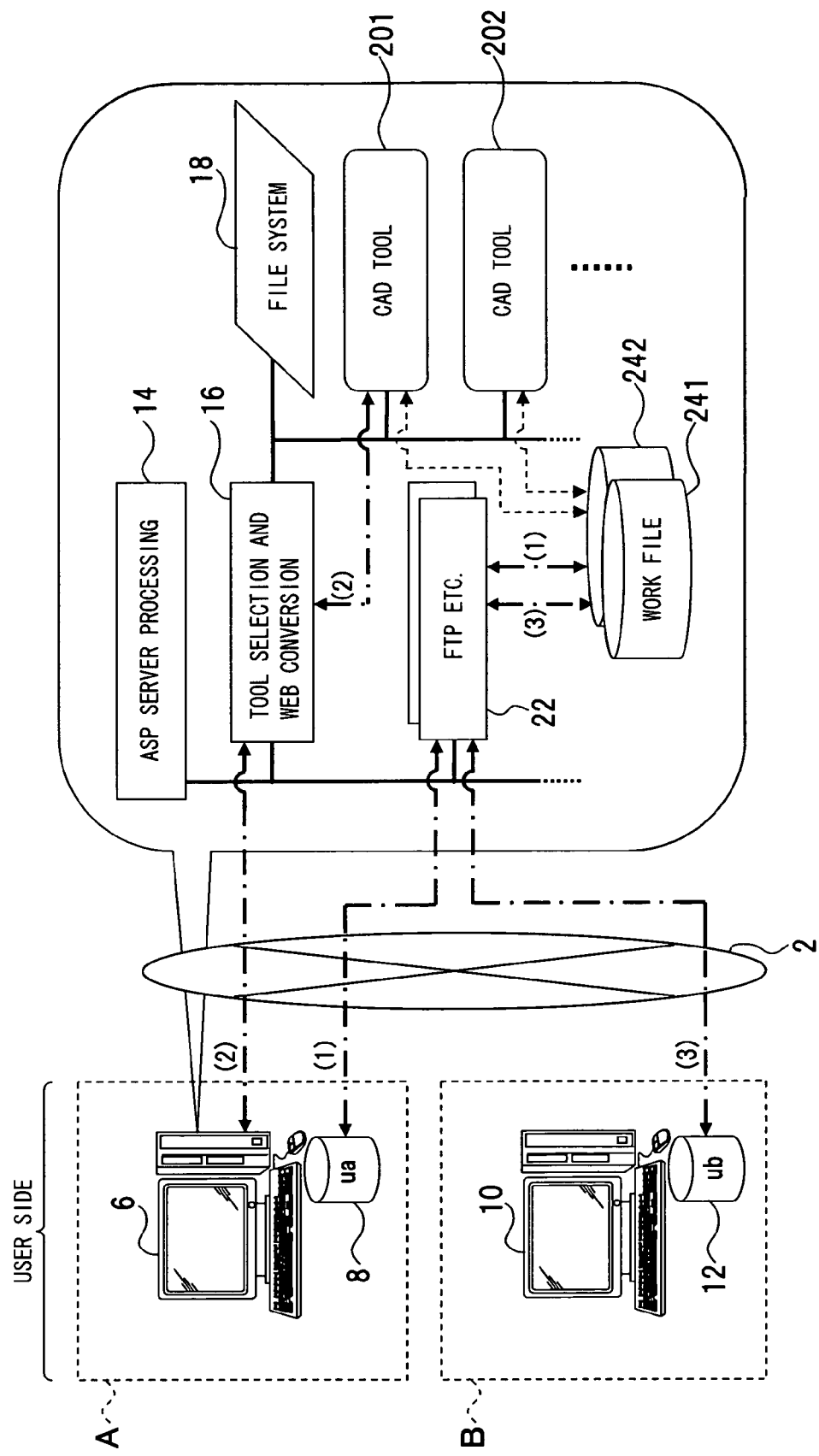
FIG. 2 shows a processing procedure in ASP processing.

Referring back to FIG. 4, when information processing is to be performed between the information processing centers 301 and 302 in an ASP (Application Service Provider) environment, ASP server processing 50 is performed in the computer 42 of the information processing center 301. The ASP server processing 50 includes the above-described hyper framework (HFW) 52 that eliminates the need for file transfer and processing accompanied by reception of files resulting from CAD processing, unlike in the known ASP processing (FIG. 2), and also increases the data transfer rate. The HFW 52 is a program that changes an access method through basic library rewriting to achieve high-speed collaboration between remote sites without changing existing various processing resources. It generates modeled information processing resources through wide-area processing model definition and systematic definition of operational collaboration for faster processing control. The HFW 52 is a collection of resource-control definitions through, for example, a GUI (Graphical User Interface). It includes collaboration file (input/output) definition (local/external), startup tool definition, mirroring (updating) definition, processing condition definition (resource control), related job (JOB) condition definition, hierarchical job model definition, etc. For startup tool definition, the basic software (OS: Operating System) for executing programs in the computer system is selected. The HFW 52 causes DLL (Dynamic Link Library) rewriting 54 to be automatically performed. A DLL is an OS's quasi-hardware-access function. Information rewritten into a DLL is stored in preset work files 561 and 562. The HFW 52 is also provided with CAD tools 581 and 582. In the above-described related job definition or hierarchical job model definition, jobs are work units for processing in the computer.

In this ASP server processing 50, the HFW 52 is opened, the DLL is accessed, DLL rewriting is automatically performed, a desired tool is selected from, for example, the CAD tools 581 and 582, and required files are specified. Through this processing, a hierarchical collaboration model and utilization-resource definition are provided.

According to this processing, file transfer and processing associated with the reception of result files after CAD processing are not necessary, unlike in the known ASP server processing (FIG. 2), access destinations of existing access functions can be changed, replacement with the DLL is performed, and the transfer rate of data replaced with a DLL can be enhanced because the DLL performs UDP (User Datagram Protocol) processing. As a result, necessary processing can be carried out with only tool selection and tool operation as essential processing. This enables remote center servers to be operated easily at high-speed by the same degree of operation as local operation. Furthermore, the function of simultaneously transferring information from one base to a plurality of bases (1:n simultaneous transfer), parallel collaboration/independent collaboration through model-definition of networks, general-modeling of information resources among remote sites through hierarchical processing concept, and large-scale collaboration and scaling-up are facilitated. The data transfer rate can further be improved through parallel transfer, which is to be described later.

Figure 6:
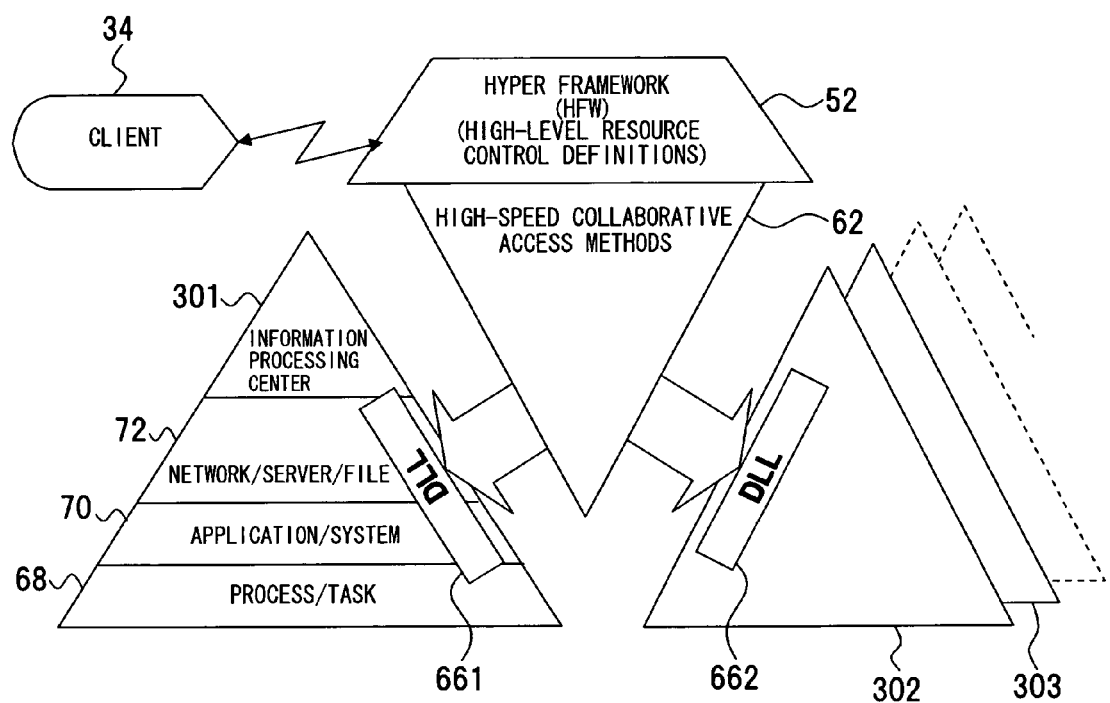
FIG. 6 is a diagram depicting the structural concept of a HFW and the structure of an information processing center.
Figure 7:
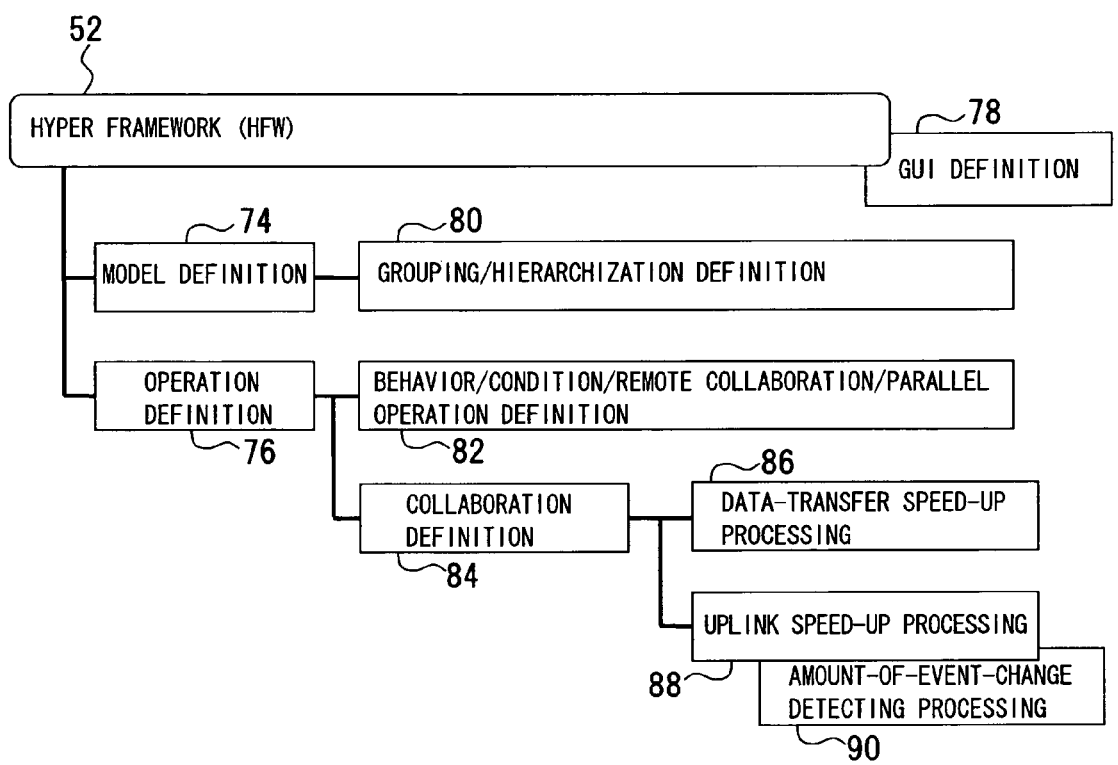
FIG. 7 is a diagram depicting a definition structure.

The HFW (hyper framework) will now be described with reference to FIGS. 6 and 7. FIG. 6 is a diagram depicting the structural concept of the HFW and the structure of an information processing center. FIG. 7 is a diagram depicting a definition structure.

The HFW 52 is a program for high-speed information processing, and is a high-level collection of resource control definitions for achieving high-speed collaboration, for example, among the information processing centers 301, 302, 303, etc. The functions of the HFW 52 include overwritten DLLs that make a change of existing applications unnecessary, a collection of resource model definitions for controlling the DLLs for general purposes, and a collection of operation definitions for the resource models. In this case, the information processing centers 301 to 303 constitute data centers. The HFW 52 is controlled by the client 34. In the structure shown in FIG. 6, the HFW 52 includes high-speed collaboration access methods 62, DLLs 661, 662, . . . written to the information processing centers 301, 302, etc. For example, the information processing center 301 includes a process/task 68, an application/system 70, and a network/server/file 72.

Referring to FIG. 7, the collection of definitions of the HFW 52 includes model definition 74, operation definition 76, GUI definition 78, etc. The model definition 74 includes grouping/hierarchization definition 80. The operation definition 76 includes "behavior/condition/remote collaboration/parallel operation definition" 82 and collaboration definition 84. The collaboration definition 84 includes data-transfer speed-up processing 86, uplink speed-up processing 88, etc. The uplink speed-up processing 88 includes amount-of-event-change detecting processing 90. The amount-of-event-change detecting processing 90 includes, for example, difference detection due to mouse movement.

Figure 8:
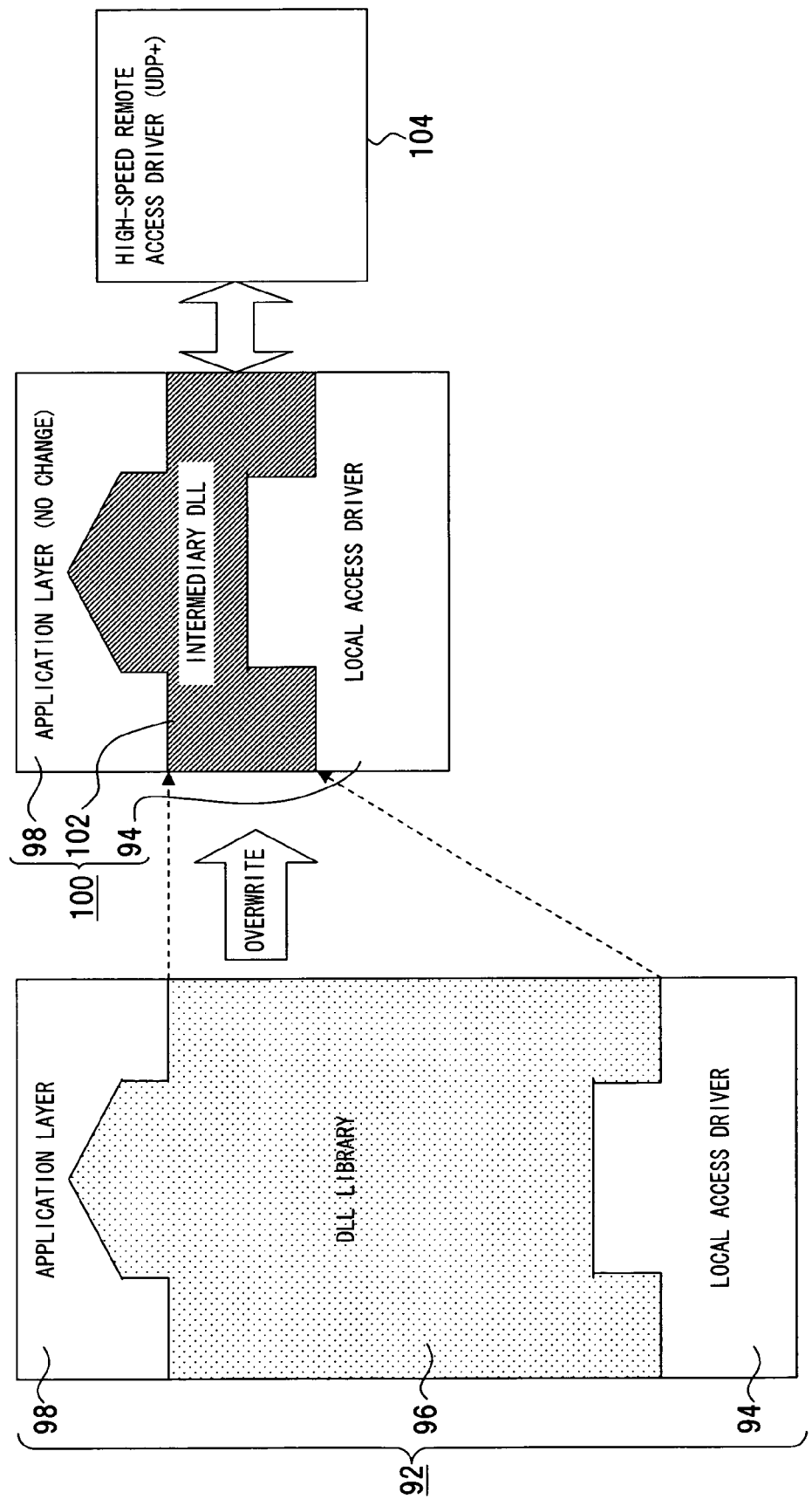
FIG. 8 depicts remote access for DLL rewriting by a HEW.

DLL rewriting in the HFW will now be described with reference to FIG. 8, which depicts remote access.

A file 92 has an access function hierarchy structure, which includes, for example, a local access driver 94, a DLL library 96, and an application layer 98. The file 92 is converted into a file 100 by overwriting the DLL library 96. More specifically, the DLL library 96 is replaced with an intermediary DLL 102. The file 100 is linked to incorporate a high-speed remote access driver 104. The high-speed remote access driver 104 includes, for example, UDP+ as a driver for higher transfer rate. The UDP is a protocol that allows the IP (Internet Protocol), which is a network layer protocol, to be used from an application. For the UDP, a port number and a checksum are added to data sent from an application, and the data is then transferred in IP packets.

Since the DLL library 96 accessed by an application is replaced with the intermediary DLL 102, as described above, the high-speed remote access driver 104 can be incorporated without applying a change to the existing application layer 98 to speed up remote access.

Figure 9:
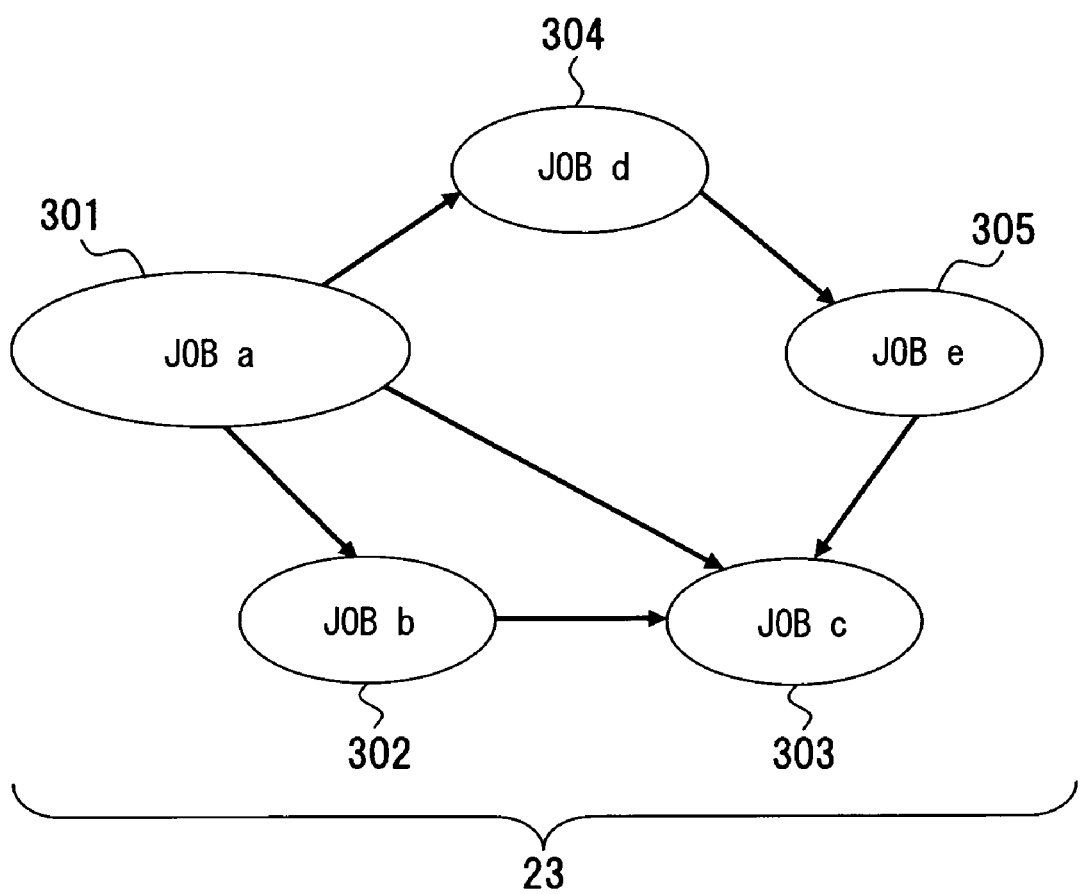
FIG. 9 is a diagram illustrating fast processing control in which the functional concept shown in FIG. 7 is used.
Figure 10A:
FIGS. 10A and 10B are diagrams depicting a collaborative relationship table and a collaboration matrix table, respectively.
Figure 10B:
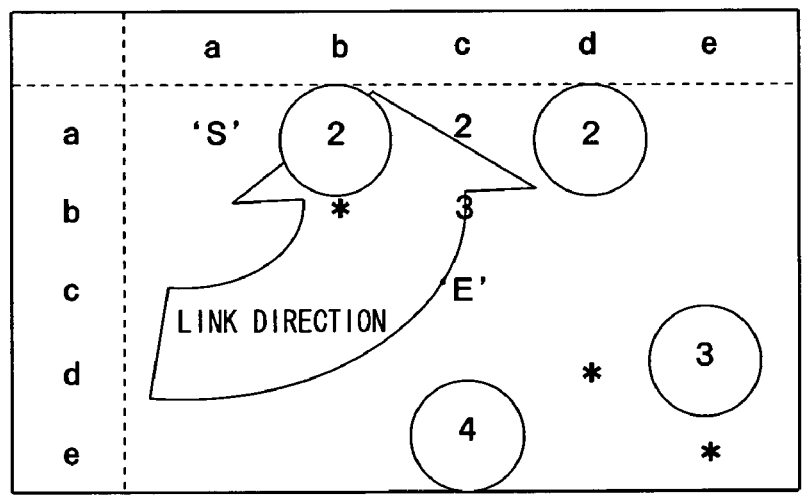
Figure 11:
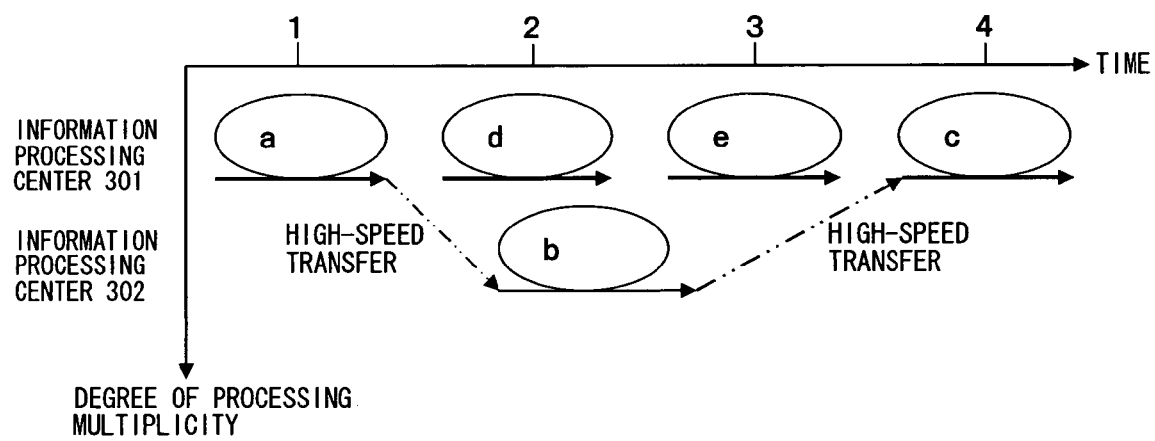
FIG. 11 is a diagram depicting processing time and the degree of multiplicity at an information processing center.
Figure 12:
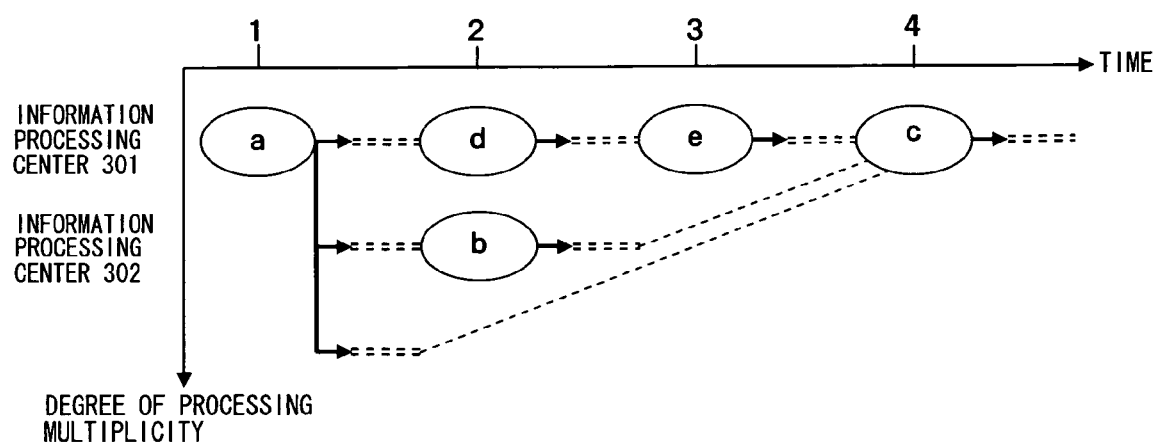
FIG. 12 is a diagram depicting processing time and the degree of multiplicity at an information processing center.

Speed-up processing control will now be described with reference to FIGS. 9, 10A, 10B, 11, and 12. FIG. 9 is a diagram illustrating fast processing control in which the functional concept shown in FIG. 7 is used. FIGS. 10A and 10B are diagrams depicting a collaborative relationship table and a collaboration matrix table, respectively. FIGS. 11 and 12 are diagrams depicting the relationships between processing time and the degree of multiplicity of information processing centers.

Referring to FIG. 9, a giant processing chain 23 capable of processing a giant job is constructed to achieve high-speed processing control through systematic definition of collaborative operation that enables collaboration among a plurality of the remote information processing centers 301, 302, 303, 304, and 305 based on the above-described collection of definitions of the HFW 52. In FIG. 9, it is assumed that the information processing centers 301 to 305 have jobs a, b, c, d, and e, respectively.

In the collaborative relationships shown in FIG. 9, arrows indicate link destinations. The job a is linked with the jobs b, c, and d. The job b is linked with the job c. The job d is linked with the job e. The job e is linked with the job c. This giant processing chain 23 is a concept for realizing high-speed processing control by systematic definition of the above-described collaborative operation, where many jobs, such as the jobs a, b, c, d, and e, are included.

A collaborative relationship table (FIG. 10A) defining the structure and processing sequence of the jobs a, b, c, d, and e is input to generate a collaboration matrix table (FIG. 10B) including link destination jobs and link levels. In this case, reverse links can also be assigned to further improve the processing speed at the time of updating.

In the collaborative relationship table (FIG. 10A), the job names a to e are shown in the left column. In the right column, job names of link destination (collaboration) jobs corresponding to the job names in the left column are shown. The collaborative relationships of the collaborative relationship table correspond to the relationships in FIG. 9. "END" represents the end of link.

In the collaboration matrix table (FIG. 10B), for example, N=2, N=3, and N=4 are set, where N is the number of link levels of the link destinations. Arrows indicate link directions. "S" and "*" indicate release of link. The processing sequence is arranged in the reverse order from the maximum value by setting the number of link levels N. In this case, jobs where the number of link levels is duplicated can be processed or collaborated in parallel, and the processing speed can be increased through this parallel collaboration.

The processing of the information processing centers 301 and 302 proceed, for example, as shown in FIG. 11. In FIG. 11, the horizontal axis represents processing time, and the vertical axis represents the level of multiplicity of job processing. Processing proceeds and time passage occurs in the direction of arrows. In this case, high-speed transfer is carried out from job a to job b, and high-speed transfer is carried out from job b to job c. The transfer time can be calculated by measuring the network environment during this transfer.

Referring to FIG. 12, the above-described processing leads to time reduction at the communication portions indicated by double dotted lines by about 90% compared with the known processing. This time reduction is effective for speeding up the overall processing especially in frequent high-speed transfer, such as in a case where a giant job is divided for distribution, collaboration, and high-speed transfer among many information processing centers.

Figure 13:
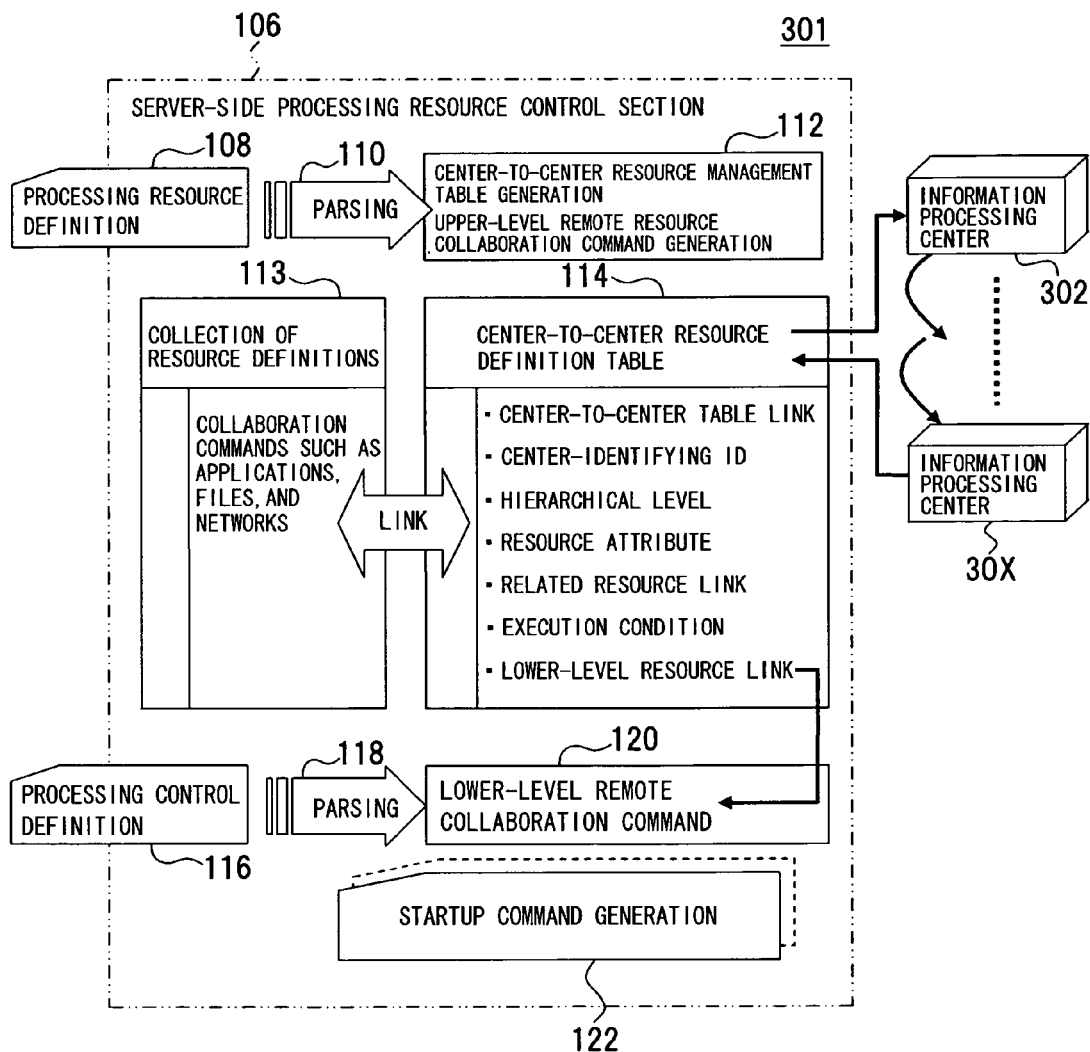
FIG. 13 is a diagram depicting a concept of processing control of information processing resources.
Figure 14:
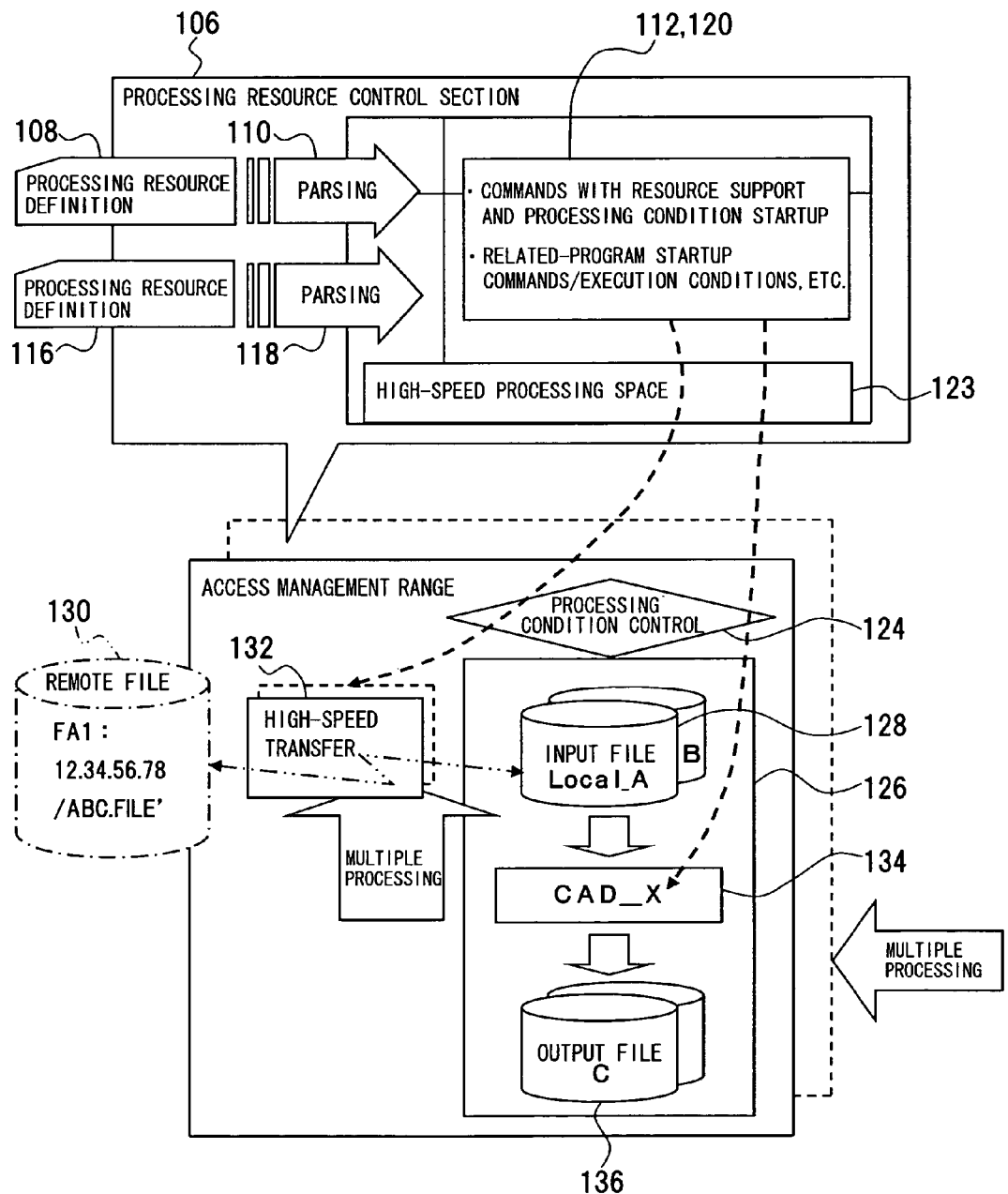
FIG. 14 is a diagram depicting a startup command.
Figure 15:
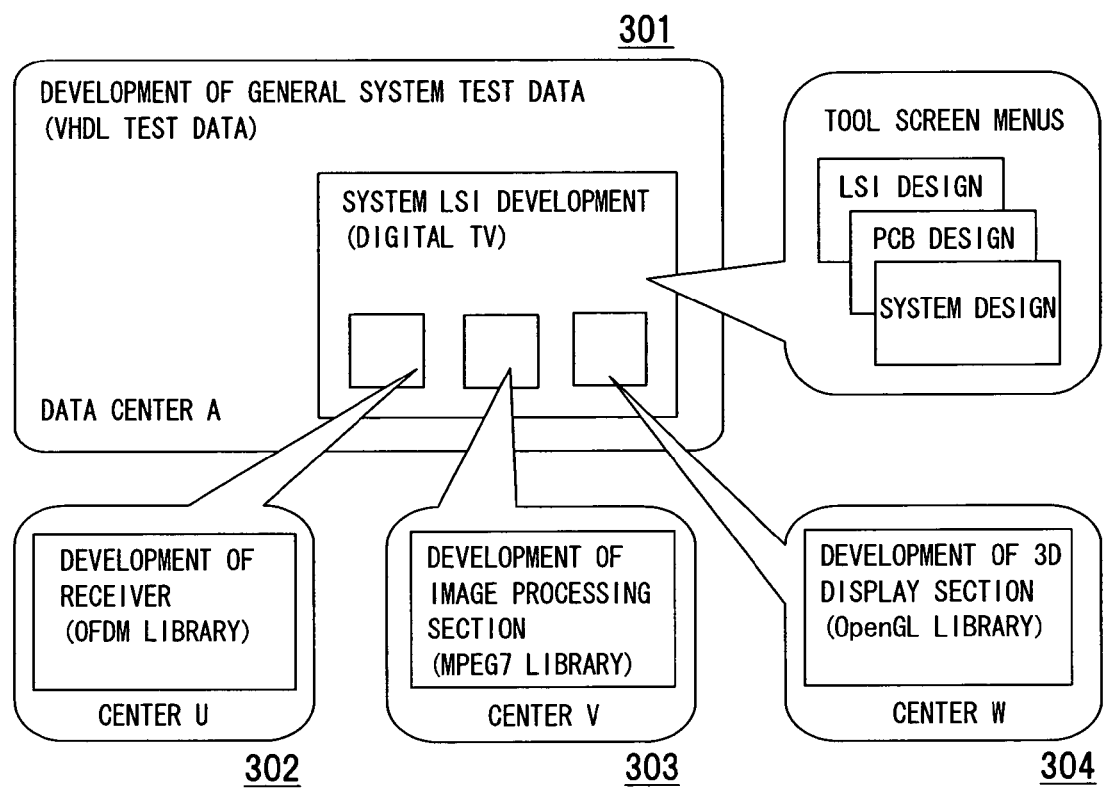
FIG. 15 is a diagram depicting a concept of processing control between remote files.

Processing control of various information processing resources will now be described with reference to FIGS. 13, 14, and 15. FIG. 13 is a diagram depicting a concept of processing control of information processing resources. FIG. 14 is a diagram depicting a concept of processing control between remote files. FIG. 15 is a diagram depicting one example of base distribution design.

Various processing resources are subjected to modeling into collaboratable units. More specifically, for model definition of remote collaborative processing, the basic components of each of processing resources, namely, hardware, software, and network, are modeled and then the models are grouped, hierarchized, and parallelized. For collaborative operation, the processing resources are systematically defined, parsed, and developed into a table to map a series of processing systems for linking.

Referring to FIG. 13, in this case, a plurality of the information processing centers 301, 302, . . . 30X are installed and collaborated. A server-side processing resource control section 106 that carries out processing related to the definition of clients is installed in the information processing center 301. In the processing resource control section 106, parsing 110 is applied to an assigned collection of processing-resource definitions 108, and "center-to-center resource management table generation processing and upper-level remote resource collaboration command generation processing" 112 is carried out. More specifically, the overall resource system is hierarchized by applying parsing 110 to the assigned collection of processing-resource definitions 108. The resources common to the information processing centers 301 and 302 and the information processing centers 302 and 30X are managed by generating a management link table that is referable and easy-to-add, delete, etc. between the information processing centers 301 and 302 and the information processing centers 30X and 301.

In this case, a collection of resource definitions 113 are defined by collaboration commands such as applications, files, and networks. For example, a center-to-center table link, a center-identifying ID (Identification), a hierarchical level, a resource attribute, a related resource link, an execution condition, and a lower-level resource link are assigned to a center-to-center resource definition table 114. The collection of resource definitions 113 and the center-to-center resource definition table 114 are linked with each other.

Furthermore, in this processing resource control section 106, parsing 118 is applied to assigned processing control definition 116, and a lower-level remote collaboration command 120 corresponding to the lower-level resource link of the center-to-center resource definition table 114 is generated. A startup command 122 is generated based on the interpretation of the processing control definition 116, and detailed-processing definition is linked to commands.

Referring to FIG. 14, for the processing of the processing resource control section 106, commands with resource support and processing condition startup, related-program startup commands/execution conditions, etc. are generated at high-speed through processing 112 and 120 based on the assigned collection of processing-resource definitions 108, the parsing 110, the processing control definition 116, and the parsing 118. More specifically, in this processing, resource definition and processing definition are interpreted, and a program startup command in which required input/output resources are described is generated. A high-speed processing space 123 constitutes high-speed processing centers distributed in a wide range.

Based on a program startup procedure and processing conditions by processing condition control 124, a specified server 126 is added on to start up a program for high-speed processing. Since an input file 128 and a remote file 130 existing at a remote site can exchange information via high-speed transfer 132 such as the above-described UDP, the input file 128 receives necessary data from the remote file 130. The acquired data is executed with, for example, CAD 134 to generate an output file 136. Multiple processing represents multiple transfer processing to be shown in FIG. 22 later.

The processing resource control section 106 is provided as described above. Processing resources and their processing operation (behavior) are defined. High-speed transfer of the information processing resources through processing based on the definitions is collaborated with processing operation that input such resources. With such processing, the transfer rate and resource operability at a long distance level are improved.

Resources are associated with each other based on the above-described definition processing. In a case of remote resources, a startup command that starts up a high-speed transfer processing program is generated. Referring to FIG. 15, in processing control for such processing, data of "general system test data development" in a data center A (e.g., the information processing center 301) is composed of VHDL (Very high-speed integrated circuit Hardware Description Language) test data. Its subordinate concept, "system LSI (Large Scale Integration) development", is carried out. This system LSI development includes system design, PCB (Printed Circuit Board) design, LSI design, etc. as tool screen menus. The system LSI development further includes development of a receiver {OFDM (Orthogonal Frequency Division Multiplexing) library} at a center U (e.g., the information processing center 302), development of an image processing-section {MPEG7 (Multimedia Content Description Interface-7) library} at a center V (e.g., the information processing center 303), and development of a 3D (three dimensional) display section (graphic library) at a center W (e.g., the information processing center 304). In short, part design distributed in the centers U, V, and W is integrated as a system at the center A into design for resource control.

Figure 16:
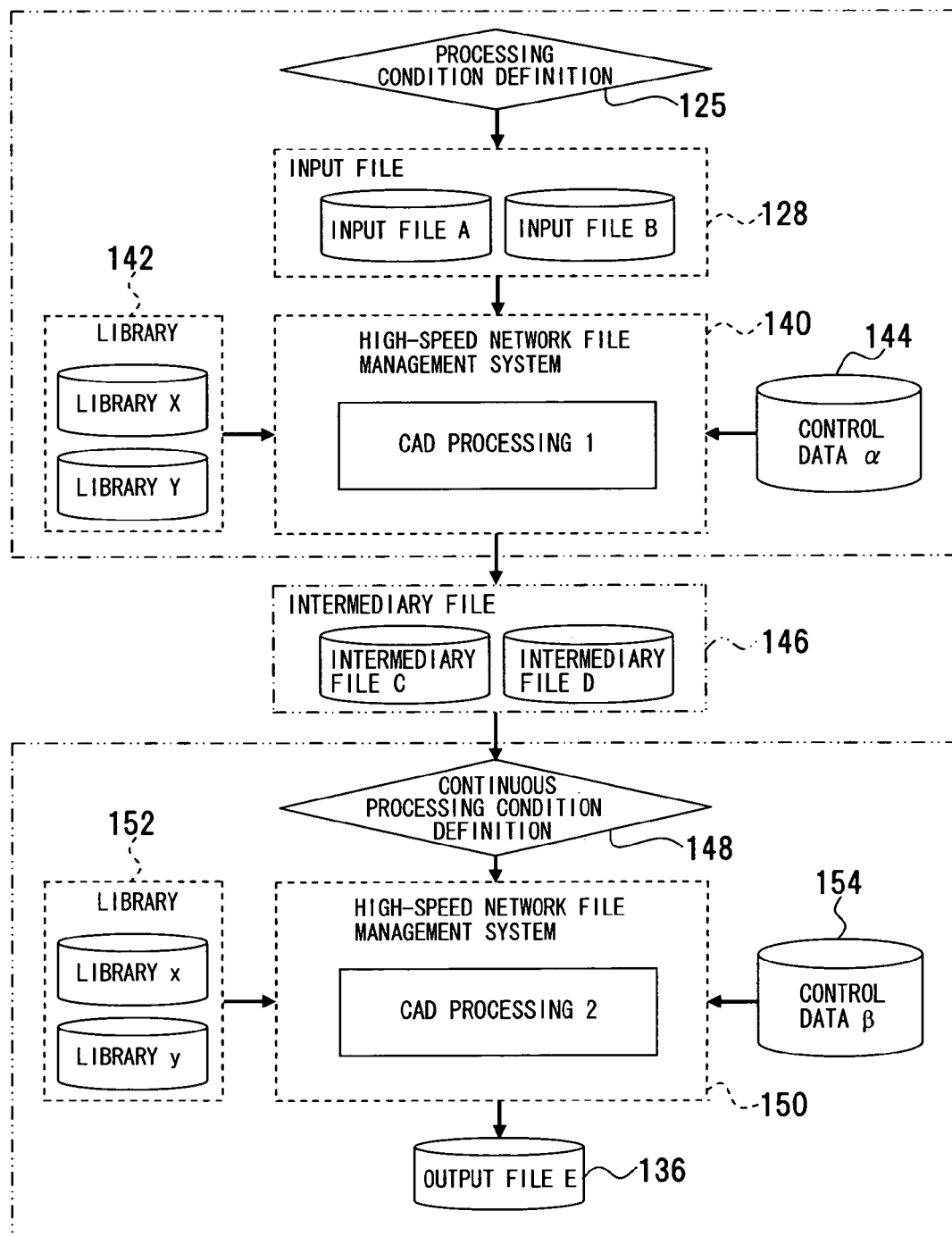
FIG. 16 is a diagram depicting a concept of continuous processing carried out by model-defining information processing resources and input/output conditions.
Figure 19:
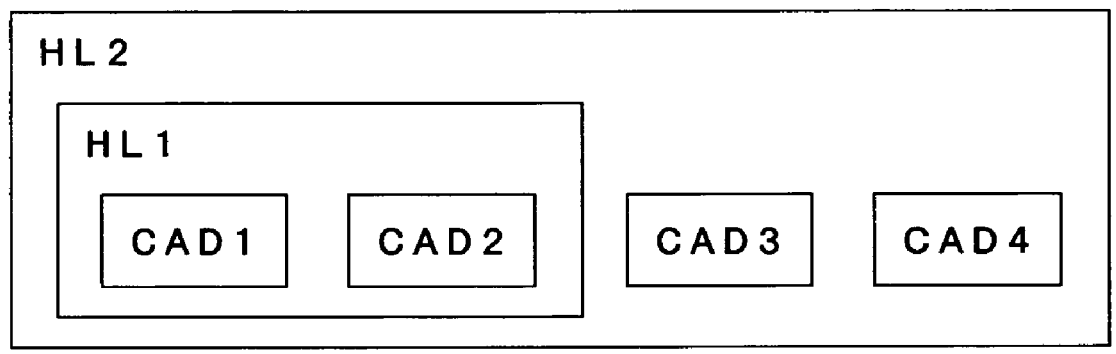
FIG. 19 is a diagram depicting a processing-resource definition example through group hierarchical processing model definition.

Continuous processing by model definition will now be described with reference to FIGS. 16, 17, 18, and 19. FIG. 16 is a diagram depicting a concept of continuous processing carried out by model-defining information processing resources and input/output conditions. FIG. 17 is a diagram illustrating an example of resource attribute definition. FIG. 18 is a diagram depicting a processing description example. FIG. 19 is a diagram depicting a processing-resource definition example through group hierarchical processing model definition. The same processing operations in FIG. 16 as those in FIG. 14 are denoted with the same reference numerals as those in FIG. 14.

In this coordination processing, processing methods such as independent parallel processing and collaborative parallel processing, processing conditions, and operation/behavior are defined for resource models (modeled processing resources) through processing operation definition for remote collaborative processing in order to achieve collaborative processing of resources at remote sites. More specifically, as a result of attribute definition for each resource in the processing condition definition 125, the input file 128 is generated and is then passed to a high-speed network file management system 140. In this high-speed network file management system 140, for example, CAD processing 1 is carried out as processing X of the CAD 134. For this performance, data required for the CAD processing is provided from a library 142 and control data α is provided from a database 144.

Data resulting from the CAD processing 1 is replaced with an intermediary file 146. In continuous processing condition definition 148, the intermediary file 146 is assigned attribute definition for each resource and passed to a high-speed network file management system 150. In the high-speed network file management system 150, for example, CAD processing 2 is carried out. For this performance, data required for the CAD processing is provided from a library 152 and control data β is provided from a database 154. The output file 136 (FIG. 14) is generated from the high-speed network file management system 150.

Referring to FIG. 17, as for definition command, definition name, and attribute, definition for each resource includes file resource definition, processing resource definition, mirroring file definition, utilization resource definition in, for example, bottom-up processing through processing hierarchical model definition, and processing hierarchy definition. File resource definition is expressed as, for example, "FA=hftp: 12.34.56.78/ABC.FILE;" (hftp=meaning high-speed file transfer). Processing resource definition is expressed as, for example, "CAD1=JOB123, CAD2=JOB987;". Mirroring file definition is expressed as, for example, "MIRF=C:\MIRROR.FILE;". A definition name in processing hierarchy definition is expressed as, for example, "L1:CAD1, CAD2;".

In the processing behavior definition, processing methods, conditions, operation/behavior, resource collaboration with remote sites, collaborative operation such as practical collaborative utilization, etc. are defined for the above-described resource models. This definition includes processing behavior definition (resource control), processing condition specification, etc. The processing behavior definition (resource control) is expressed as, for example, ":if/for/while/do;". Processing condition specification is expressed as, for example, ":if (CAD1.STT>9)break;". If the completion code of the processing of CAD1 is higher than "9" in "CAD1.STT>9" as a processing condition, the subsequent processing is terminated.

With processing rules specified based on these resource definitions, coordination operation sharing files distributed at a plurality of remote bases and continuous collaborative processing using files at remote bases become possible. For definition in this processing, "fdef FA, FB, FC, FD, LX, LY;" is expressed for, for example, file definition. Continuous collaborative processing between remote sites and its control become possible by giving such a series of definitions.

Attributes of each resource are defined as shown in FIG. 17. As a result of processing rules (FIG. 18) being specified based on this resource definition, collaborative operation sharing distributed files and continuous collaborative processing using files at remote sites become possible. As shown in FIG. 19, processing resources are defined through group hierarchy processing model definition. As is apparent from this definition, for example, with regard to CAD files CAD1, CAD2, CAD3, and CAD4 as processing resources, CAD1 and CAD2 are grouped in group definition HL1, and processing is possible in units of the group definition HL1. The group definition HL1, CAD3, and CAD4 are included in parent-child definition HL2. In other words, HL2 has a relationship of large group definition with HL1. In that group, the group definition HL1, CAD3, and CAD4 are at the same level. This parent-child definition HL2 is above the group definition HL1, the group definition HL1 is below the parent-child definition HL2, and there is a hierarchical relationship between HL1 and HL2. Objects not included in the group definition HL1 or parent-child definition HL2 are independent of each other and can be parallelized.

Such assignment of definition finds correlation between information processing resources, and objects that can be processed independently serve as triggers for classification of parallel processing or functional classification. Especially in processing using a cluster CPU (Central Processing Unit), related jobs can be arranged in advance as a group of sequence processing for processing that requires priority indicating parent-child relationships of resources or the temporal order. Such processing is very important since it contributes to efficient collaboration of information processing resources existing at remote sites and efficient data collaboration.

Figure 20:
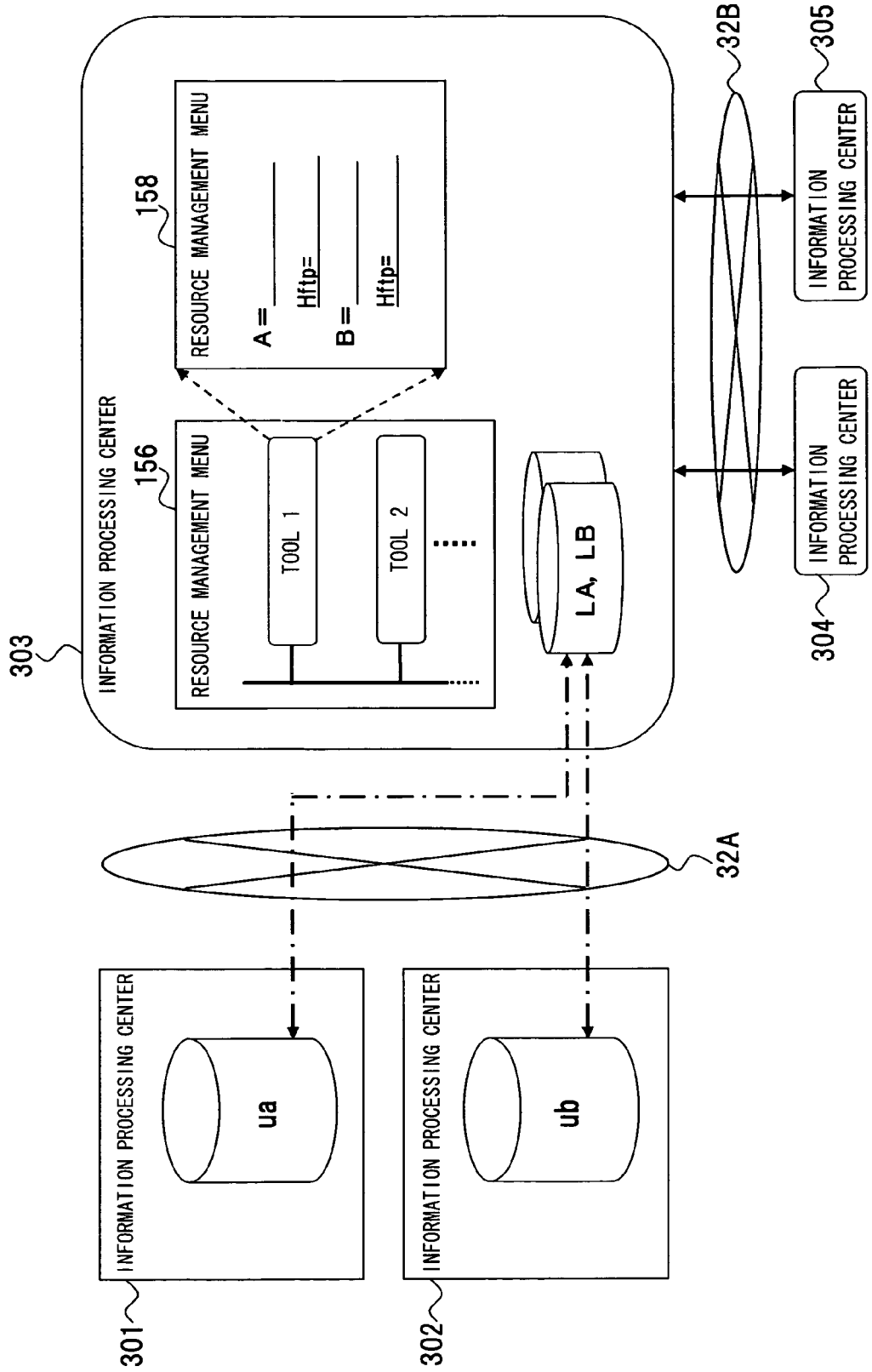
FIG. 20 is a diagram depicting display content of related resources.

Facilitation of definition of related information processing resources will now be described with reference to FIG. 20, which is a diagram depicting display content of related resources.

Modeled related information processing resources are visually displayed to facilitate various types of definition. In this mechanism, resource information to be processed at each base is specified. For example, the processing capacity, files, applications, networks, etc. are specified. Related collaborative items include applications, data support, etc.

In this display example (FIG. 20), the information processing centers 301, 302, 303, 304 and 305 and the networks 32A and 32B are displayed. The file ua is displayed in the information processing center 301, the file ub is displayed in the information processing center 302, and resource management menus 156 and 158 and work files LA and LB are displayed in the information processing center 303. The resource management menu 158 is detail display of a tool 1 displayed in the resource management menu 156. In this case, the networks 32A and 32B may be constructed as a single network 32.

Figure 21:
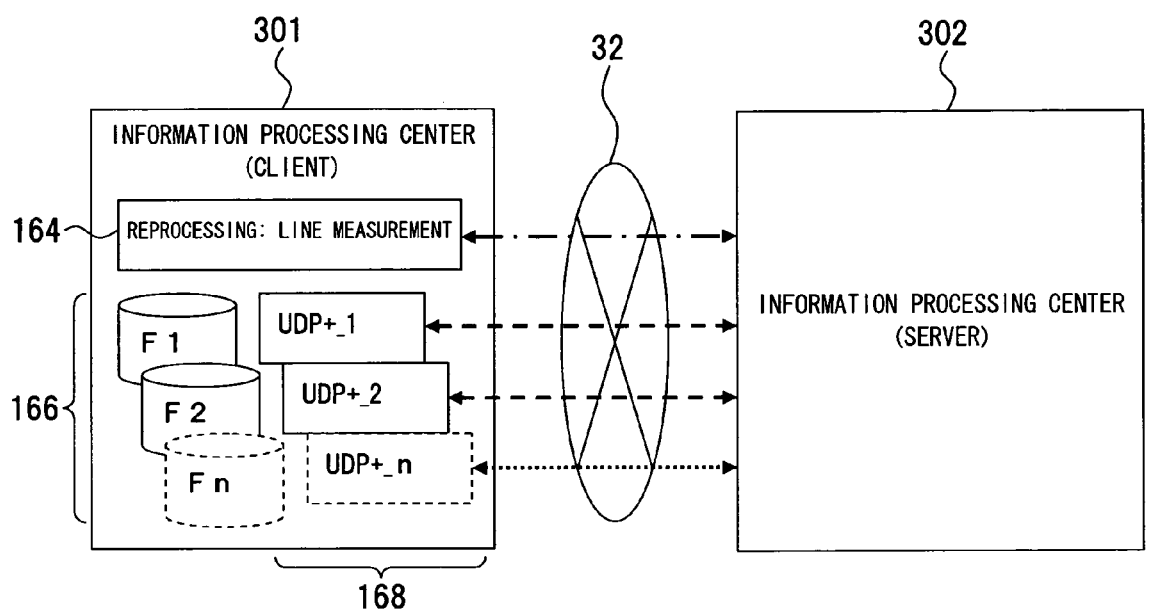
FIG. 21 is a diagram depicting a transfer processing concept.
Figure 22:
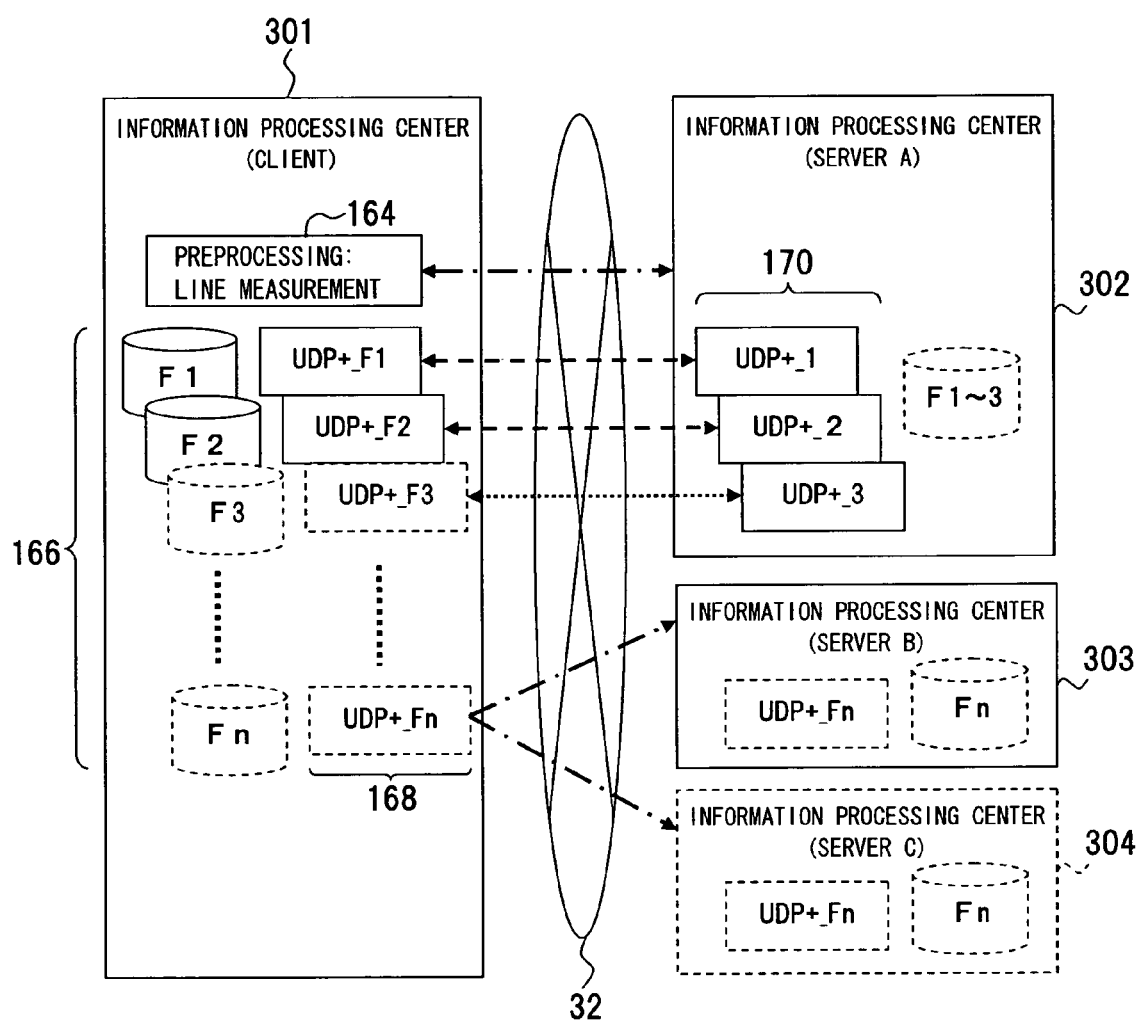
FIG. 22 is a diagram depicting a processing example for performing parallel transfer of a plurality of data items.
Figure 23:
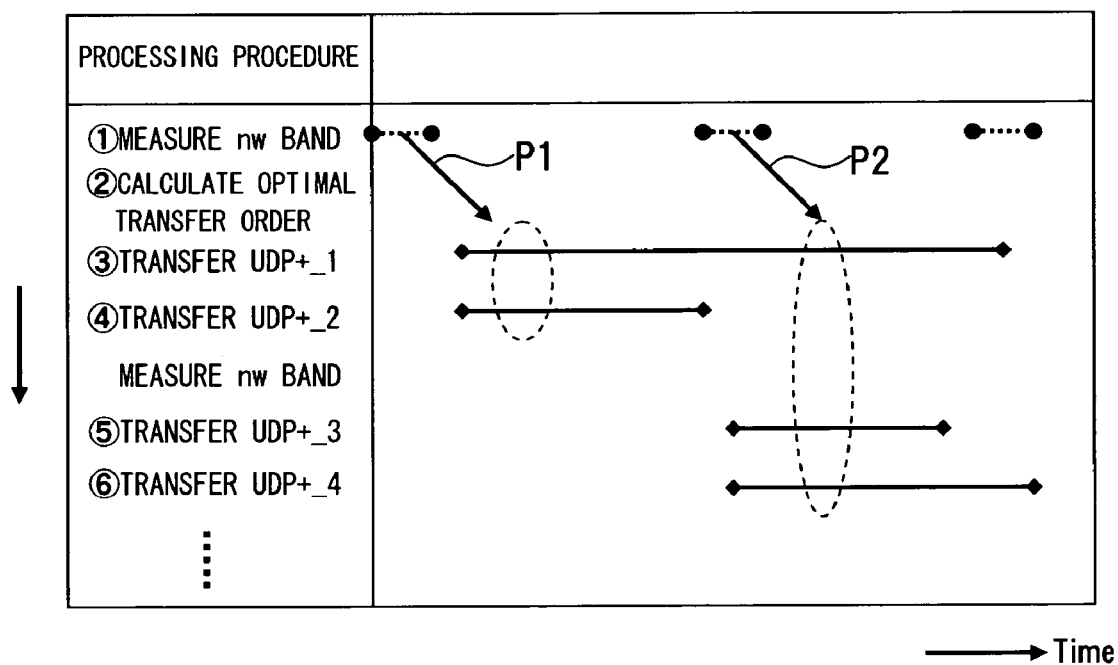
FIG. 23 is a diagram depicting the flow of processing in a case where a plurality of client-side data items is transferred in parallel to a server side.

Parallel transfer of a plurality of data items will now be described with reference to FIGS. 21, 22, and 23. FIG. 21 is a diagram depicting a transfer processing concept. FIG. 22 is a diagram depicting a processing example for performing parallel transfer of a plurality of data items. FIG. 23 is a diagram depicting the flow of processing in a case where a plurality of client-side data items is transferred in parallel to a server side. The same components are assigned the same reference numerals throughout the figures.

In the processing shown in FIG. 21, for example, a plurality of data items in the information processing center 301 functioning as a client is transferred in parallel via the network 32 to, for example, the information processing center 302 functioning as a server. Transfer files 166 are provided as the plurality of data items. In this example, transfer files F1, F2, . . . Fn are rewritten into UDP+1, UDP+2, . . . UDP+n as UDPs 168.

Referring to FIG. 22, for example, the information processing centers 302, 303, and 304 exist as a plurality of servers. In this example, the files F1 to F3 are transferred to the information processing center 302, and the file Fn is transferred to the information processing centers 303 and 304. The information processing center 302 is provided with UDP+1, UDP+2, and UDP+3 as UDPs 170, and the transferred files F1, F2, and F3 are generated. Similarly, the information processing centers 303 and 304 are provided with a UDP+n as the UDPs 170, and the transferred file Fn is generated.

Line measurement is performed in preprocessing 164 of the information processing center 301 functioning as the client. In this preprocessing 164, the traffic is measured with a network command. Then, the effective range of line speed with respect to the capacities of the transfer files F1 to Fn is calculated, and parallel communication is performed based on UDP to perform file transfer at higher speed between collaborating servers.

As described above, UDP processing is a protocol in which the IP protocol as a network layer protocol can be used from an application only with a minor change. More specifically, data passed from an application is assigned only a port number and a checksum and is packed in an IP packet for transmission. Since UDP is a protocol with a function for sending data to a destination in a unilateral way, it is less intensive in protocol processing. Thus, UDP is advantageous to an application that exchanges small packets because the data transfer rate is increased without having to open/close a TOP connection or perform re-sending.

The degree of multiplicity of this file transfer is calculated through a line measurement. In this case, collaboration among information processing centers is achieved by means of simultaneous 1:n transmission to a plurality of information processing centers to increase the data transfer rate. With these functions, optimal data reference and transfer according to the network traffic and usage are accomplished.

Referring to FIG. 23 showing processing where a plurality of data items, for example, in the client-end information processing center 301 are transferred in parallel to, for example, the server-end information processing centers 302 to 304, processing procedures are described in the left column and processing ranges and times are described in the right column. In this processing, in the first step, the network environment is measured with a network command. Second, the line speed and parallelly transferable range and order are calculated. Third and fourth, parallel and high-speed transfer is performed based on UDP processing. At some interval, the network (nw) band is measured to calculate the degree of parallelization at which simultaneous transfer is possible and the order. Fifth and sixth, the degree of parallelization is changed though UDP processing for communication. The above-described processing is repeated. Processing operations P1 and P2 indicate multiple processing. The degree of multiplicity of the processing P1 is 2, and the degree of multiplicity of the processing P2 is 3. Thus, data reference and transfer at the highest possible speed can be performed according to the network state.

Figure 24:
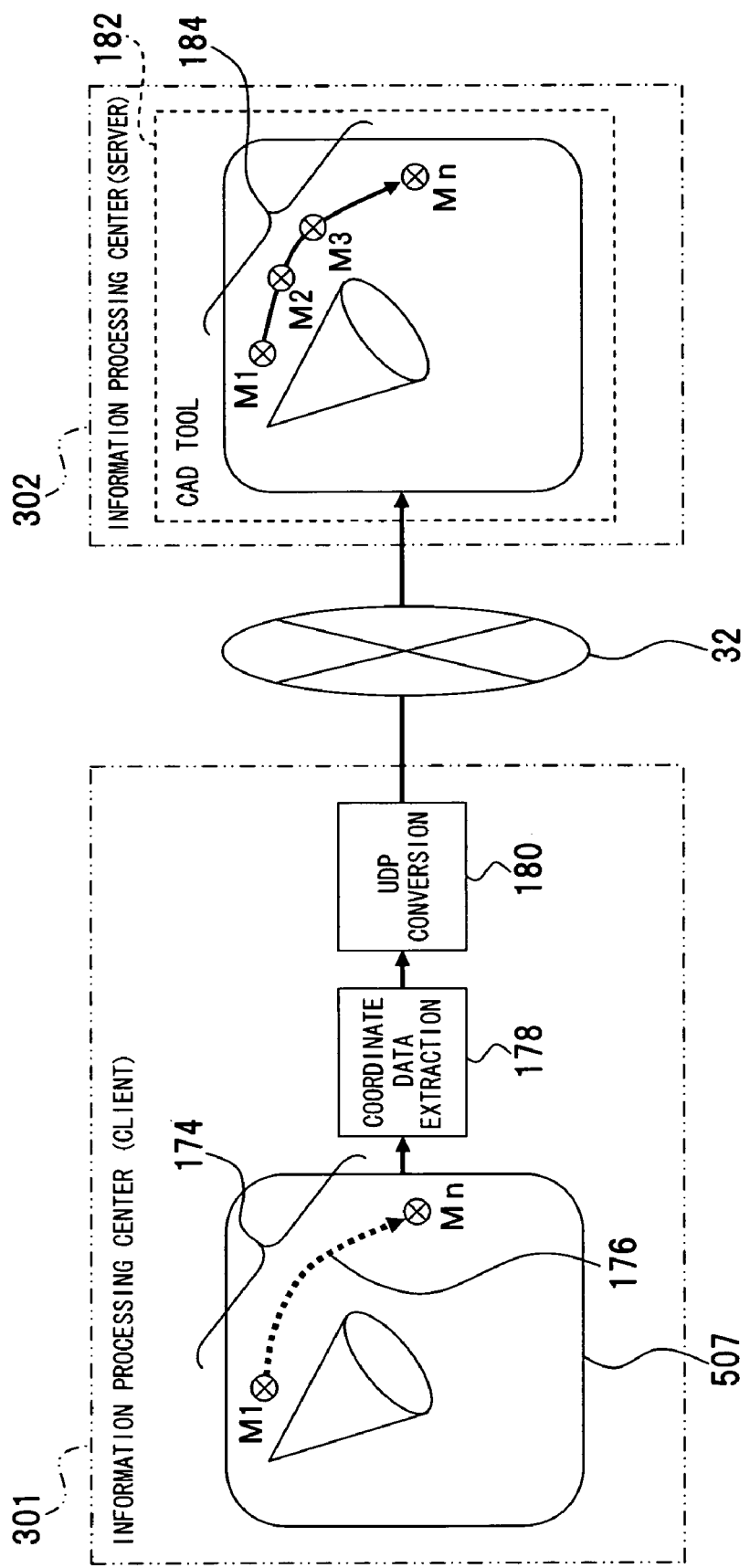
FIG. 24 is a diagram depicting processing of a mouse event at a client and a server.
Figure 25:
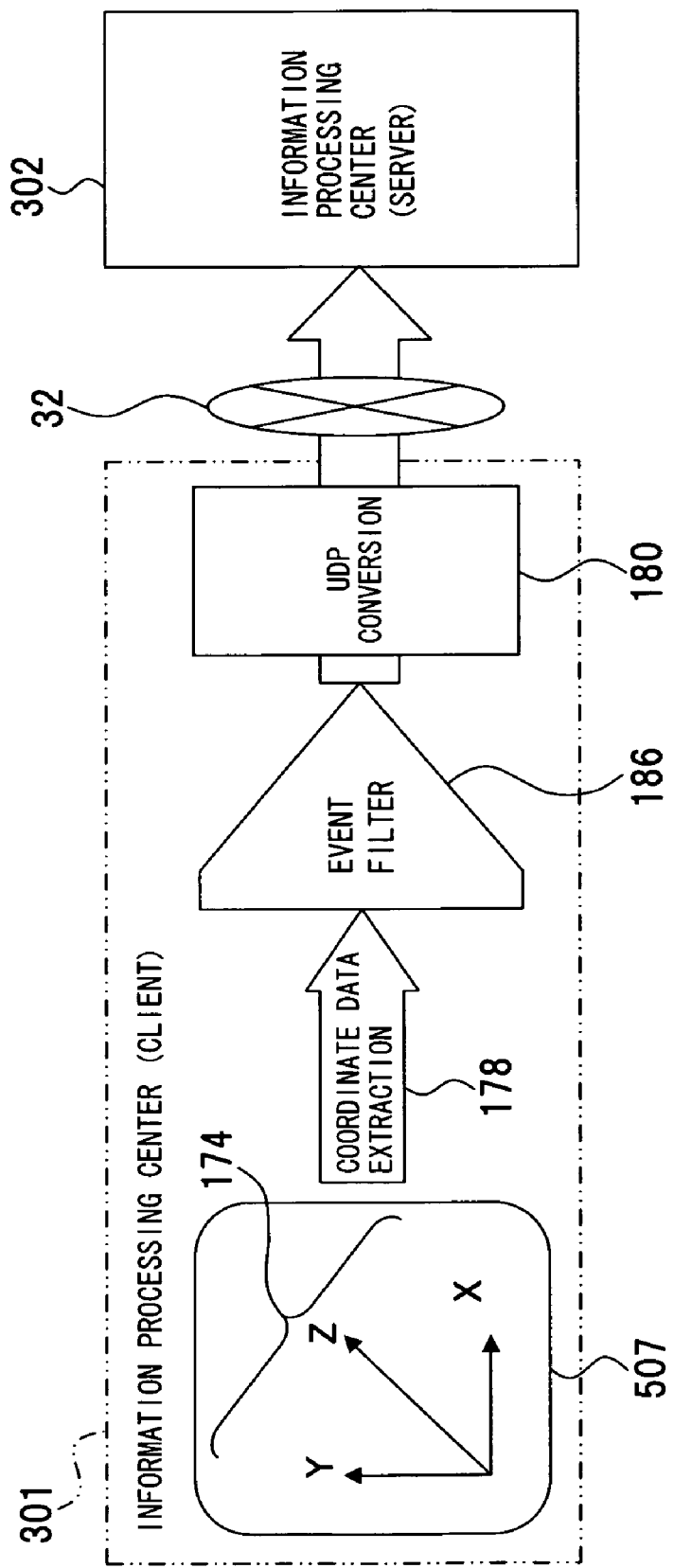
FIG. 25 is a diagram depicting one example of mouse event processing at a client.
Figure 26:
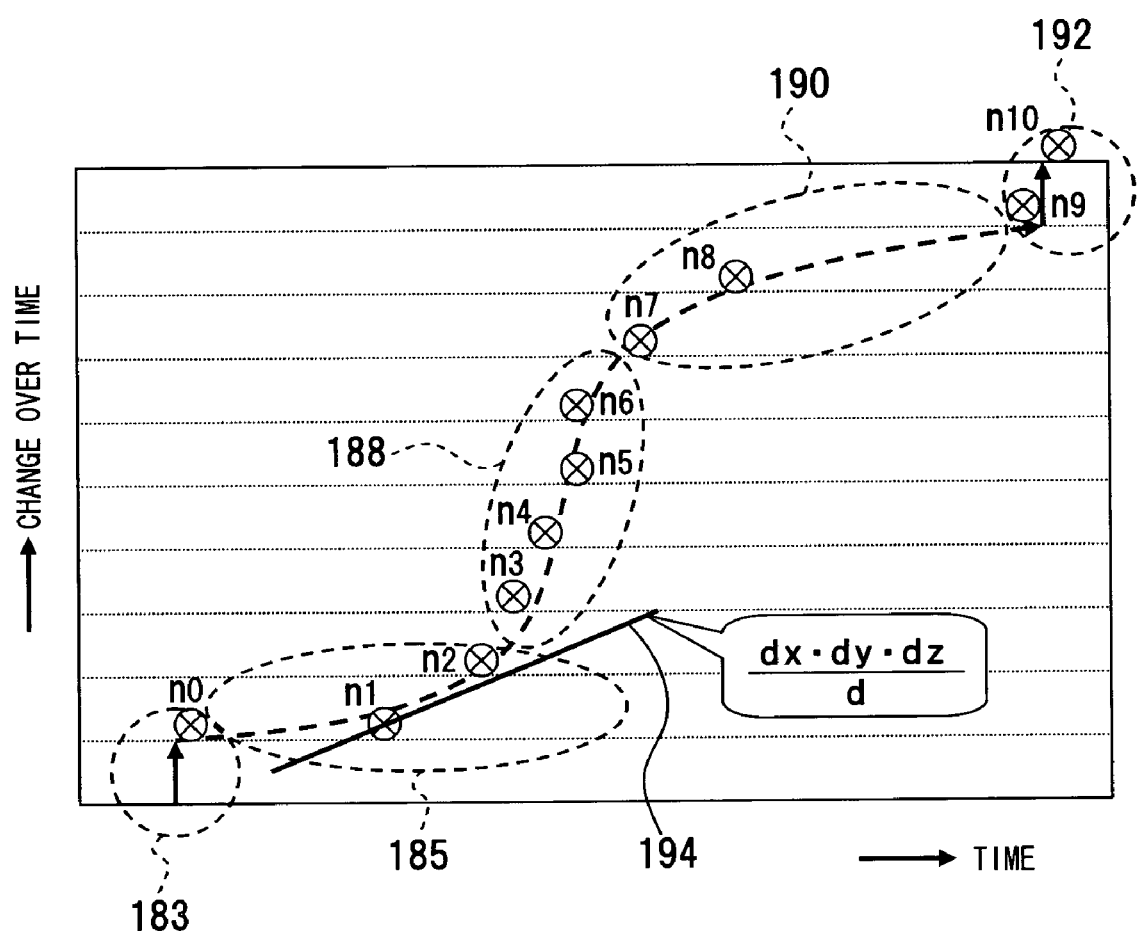
FIG. 26 is a diagram depicting a change in coordinate event at a client.

Transmission of a mouse event, from a client to a server will now be described with reference to FIGS. 24, 25, and 26. FIG. 24 is a diagram depicting processing of a mouse event at a client and a server. FIG. 25 is a diagram depicting one example of mouse event processing at a client. FIG. 26 is a diagram depicting a change in coordinate event at a client.

A mouse coordinate event 174 is displayed on the display unit 507 of the computer (e.g., computer 42 in FIG. 4) in, for example, the information processing center 301 functioning as a client. The mouse coordinate event 174 is displayed by means of a plurality of dots 176 arranged from a point M1 to a point Mn. As shown, the dots 176 of the mouse coordinate event 174 that represent movement coordinate positions of the mouse 506 (FIG. 5) are fine coordinate data.

The coordinate data is extracted through coordinate data extraction processing 178, and is then subjected to UDP conversion processing 180. Subsequently, the coordinate data is transferred to a server, e.g., the information processing center 302 via the network 32 such as the Internet. With a CAD tool 182 which is software loaded into a computer (e.g., computer 46 in FIG. 4) in the information processing center 302, a mouse coordinate event 184 is generated as server-side virtual processing. In this case, the coordinate data corresponding to a slow-movement portion of the mouse 506 is subjected to decimation. More specifically, the trace of the mouse movement from the point M1 to the point Mn is expressed with two dots M2 and M3. For this reason, the mouse coordinate event 184 contributes to a reduction in processing time compared with the mouse coordinate event 174.

The above-described decimation of coordinate data will be described in detail with reference to FIG. 25. At a client such as the information processing center 301, when three-dimensional coordinate input is performed with the mouse 506 (FIG. 5), the mouse coordinate event 174 is displayed on the display unit 507 with three-dimensional coordinates X, Y, and Z.

The coordinate data representing the mouse coordinate event 174 is subjected to coordinate data extraction processing 178, passes through an event filter 186 for data decimation, and is finally subjected to the UDP conversion processing 180. The event filter 186 extracts coordinate data with a large data variation per unit of time. This processing by the event filter 186 decimates coordinate data corresponding to a low-movement portion of the mouse coordinate event 174 ranging from the start to the end of the mouse movement. Referring to FIG. 26 showing a coordinate variation model of the mouse coordinate event 174 in which the vertical axis represents variations per unit of time and the horizontal axis represents times, the mouse coordinate event 174 starts from a movement-start point 183, proceeds via a slow-movement portion 185, a fast-movement portion 188, and a slow-movement portion 190, and finally reaches a movement-end point 192. Here, an approximating line 194 to the slow-movement portion 185 is assumed. The slope of the approximating line 194 is expressed by the derivative value dx·dy·dz/d, so that the coordinate data is decimated in a portion with a gentle slope. In this example, the mouse coordinate event 174 is composed of coordinate points n0, n1, n2, n3, n4, n5, n6, n7, n8, n9, and n10. The slow-movement portion 185 is composed of the coordinate points n0 to n2, the fast-movement portion 188 is composed of the coordinate points n3 to n6, and the slow-movement portion 190 is composed of the coordinate points n7 to n10. The coordinate points n3 to n6 in the fast-movement portion 188 are denser per unit of time, while the slow-movement portion 185 and the slow-movement portion 190 have a lower density.

According to the above-described processing, for processing that requires high responsiveness between men and machines, such as dialog processing with a remote site in an ASP environment, coordinate data resulting from mouse operation at a client (e.g., information processing center 301)

during uplink needs to be transferred at high speed. A decrease in responsiveness due to long transfer time of mouse coordinate events can be mitigated by eliminating the coordinate data with a small variation and by processing the coordinate data via the UDP conversion processing 180. This processing suppresses a decrease in communication speed for inter-continental data transfer, and hence promotes smooth moving images.

In a typical communication environment, the uplink (client to server) communication band is narrower and suffers from a lower communication speed than the downlink (server to client) communication band. More specifically, man-to-machine dialog processing in a server/client system exhibits a large delay with frequent mouse events, because the uplink (client to server) communication capacity is smaller than the downlink (server to client) communication capacity. In contrast, according to the processing shown in FIG. 25, mouse events can be transmitted fast to a server (e.g., the information processing center 302) of the information processing center 301 by decreasing the coordinate data density.

Continuous coordinate information transmission resulting from a mouse operation is highly reliable if performed via TCP/IP (Transmission Control Protocol/Internet Protocol). However, TCP/IP adds a time for bi-directional communication checking, which causes a delay in the transmission of mouse event information at the client and results in adverse effect on the responsiveness of the entire dialog processing. In contrast, the UDP conversion processing 180 is free of bi-directional communication checking, and therefore, does not exhibit a delay due to the bi-directional communication checking. This contributes to a reduction in processing time. Several comparisons between UDP and TCP are as follows. With regard to connection topology, UDP supports 1:1 or 1:n connections while TCP supports only a 1:1 connection. With regard to transmission units, data is transmitted in packets for UDP, while data is transmitted in streams for TCP. With regard to the establishment of connection before transmission, UDP is connectionless, while TCP requires the establishment of connection. With regard to computational load, UDP is less intensive than TCP in computation.

Transmission of continuous three-dimensional coordinate information resulting from, for example, a three-dimensional mouse operation adds a delay due to bi-directional communication checking and exhibits slower event information transmission at a client over a long distance, adversely affecting the responsiveness of the entire dialog processing. Coordinate data with a large variation per unit of time is extracted by the use of the event filter 186 to alleviate the communication traffic to a server, e.g., the information processing center 302. Along with this decimation of coordinate data, UDP-based communication contributes to an improvement in responsiveness.

Second Embodiment

Figure 27:
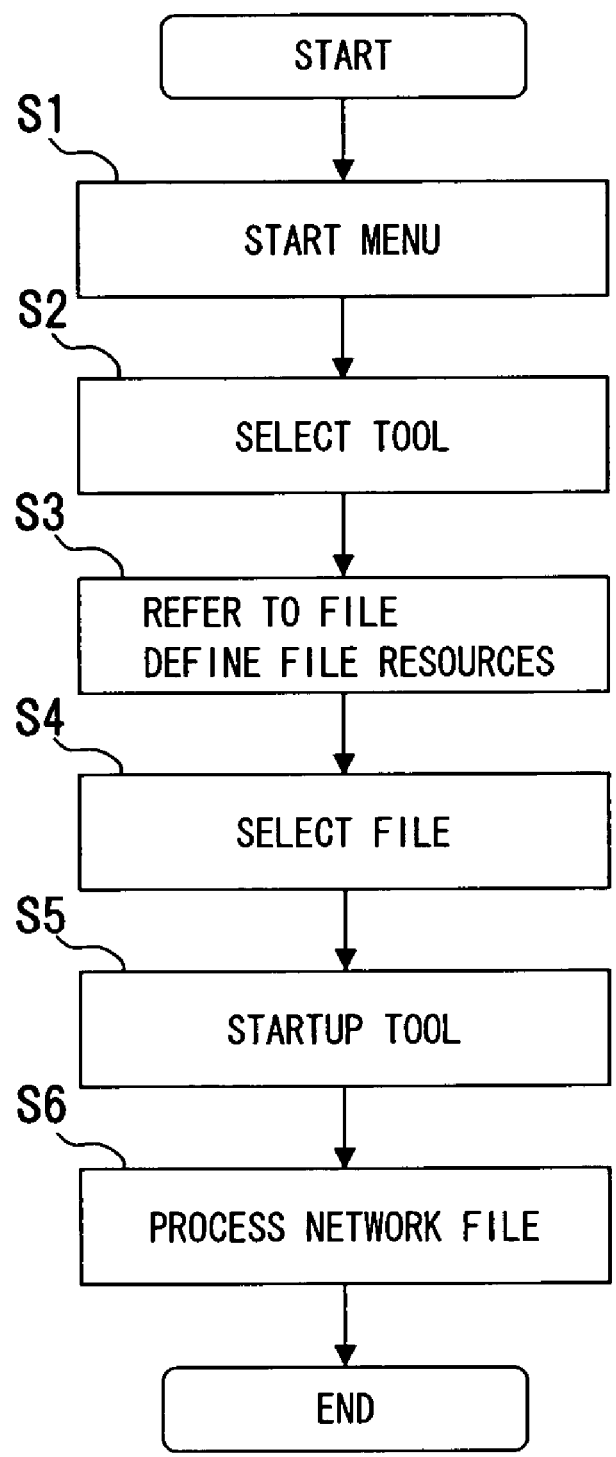
FIG. 27 is a flowchart illustrating an information processing method and program for information processing resources according to a second embodiment of the present invention.
Figure 28:
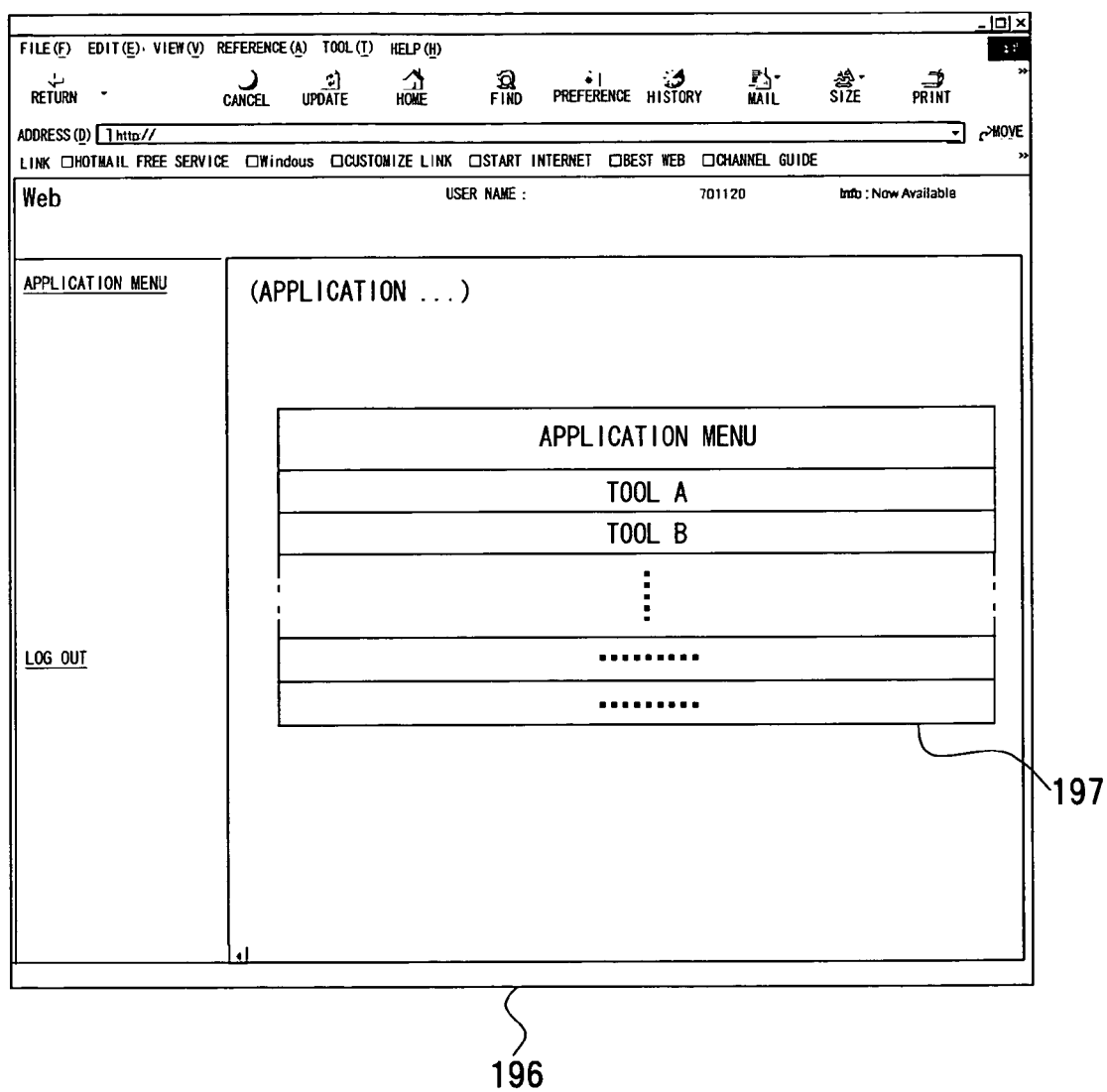
FIG. 28 is a diagram depicting a processing screen.
Figure 29:
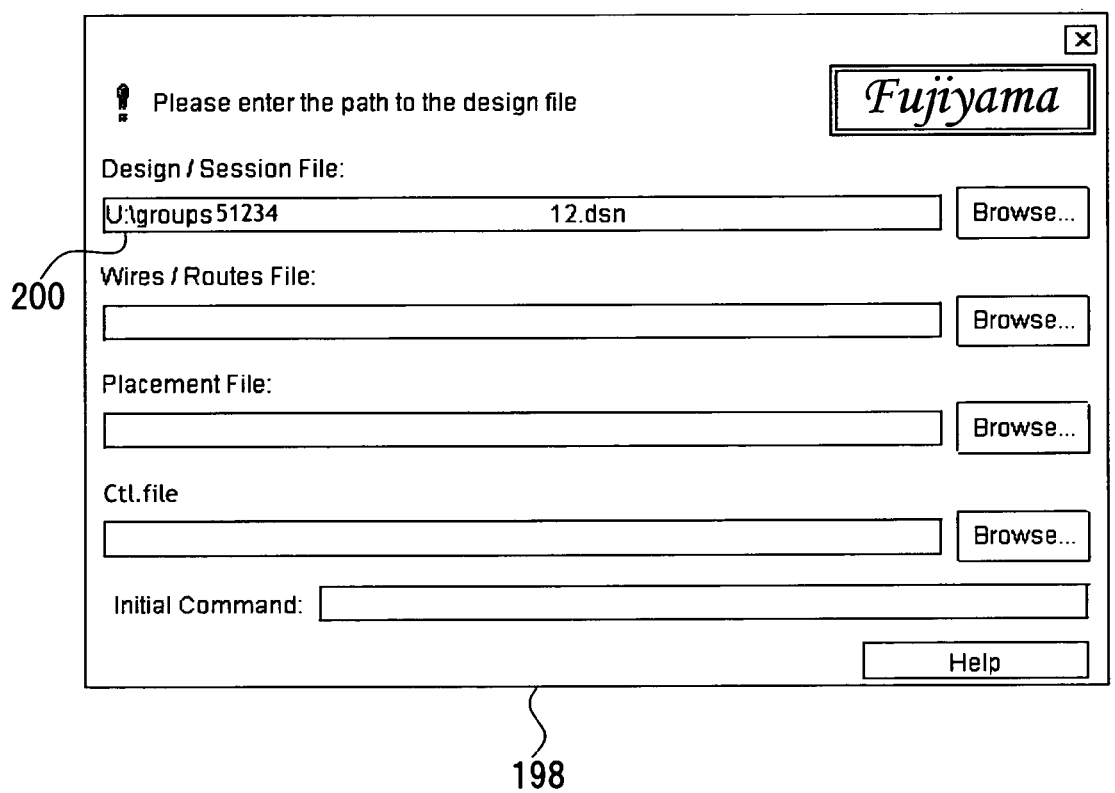
FIG. 29 is a diagram depicting a processing screen.

A second embodiment of the present invention will now be described with reference to FIGS. 27, 28, 29, 30, 31, 32, and 33. FIG. 27 is a flowchart illustrating an information processing method and program for information processing resources. FIGS. 28, 29, 30, 31, 32, and 33 are diagrams depicting display screens for processing.

Access is made to, for example, an ASP center at a remote site via the network 32 (FIG. 3), and, for example, a start menu display 196 (FIG. 28) is loaded on the display screen of the display unit 507 (FIG. 5) (step S1). A tool selection display 197 is derived from the start menu display 196, and a required tool is selected from the tool selection display 197 (step S2). When access is made to a file which is an information processing resource at a remote site, file resource definition 200 is input to a tool selection display 198 as required (step S3).

Figure 31:
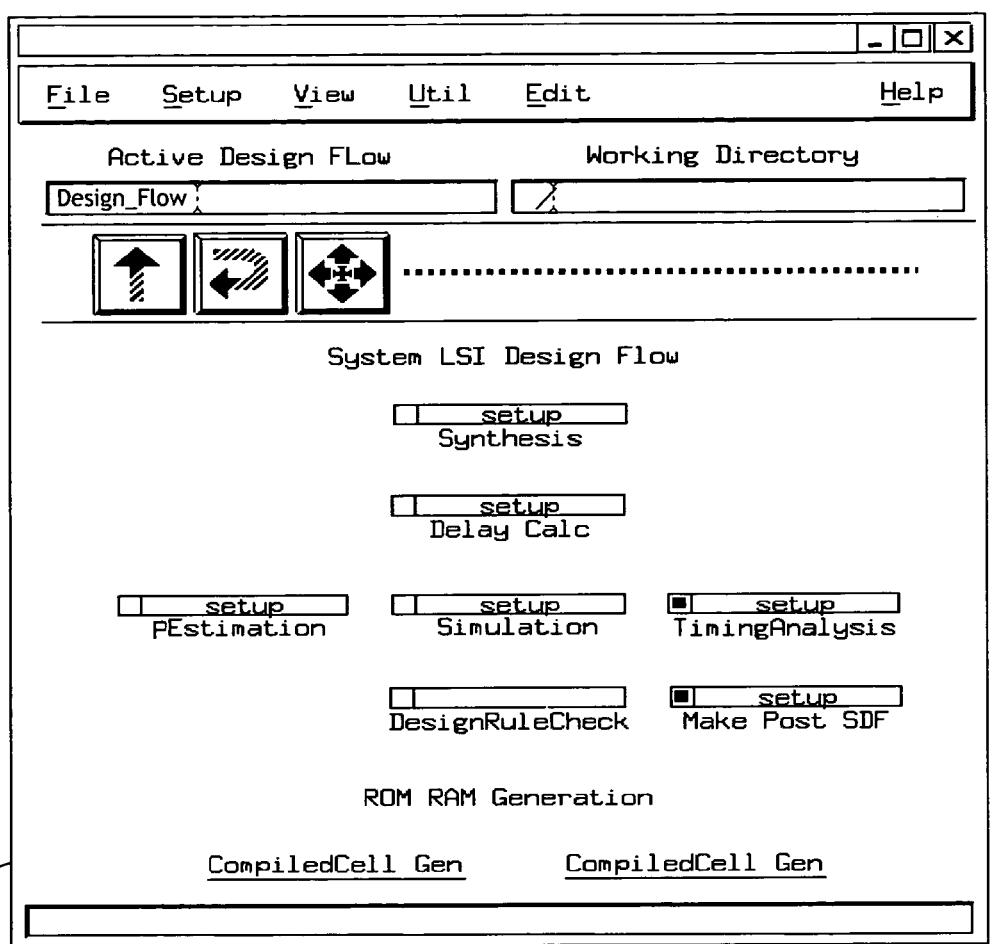
FIG. 31 is a diagram depicting a processing screen.
Figure 32:
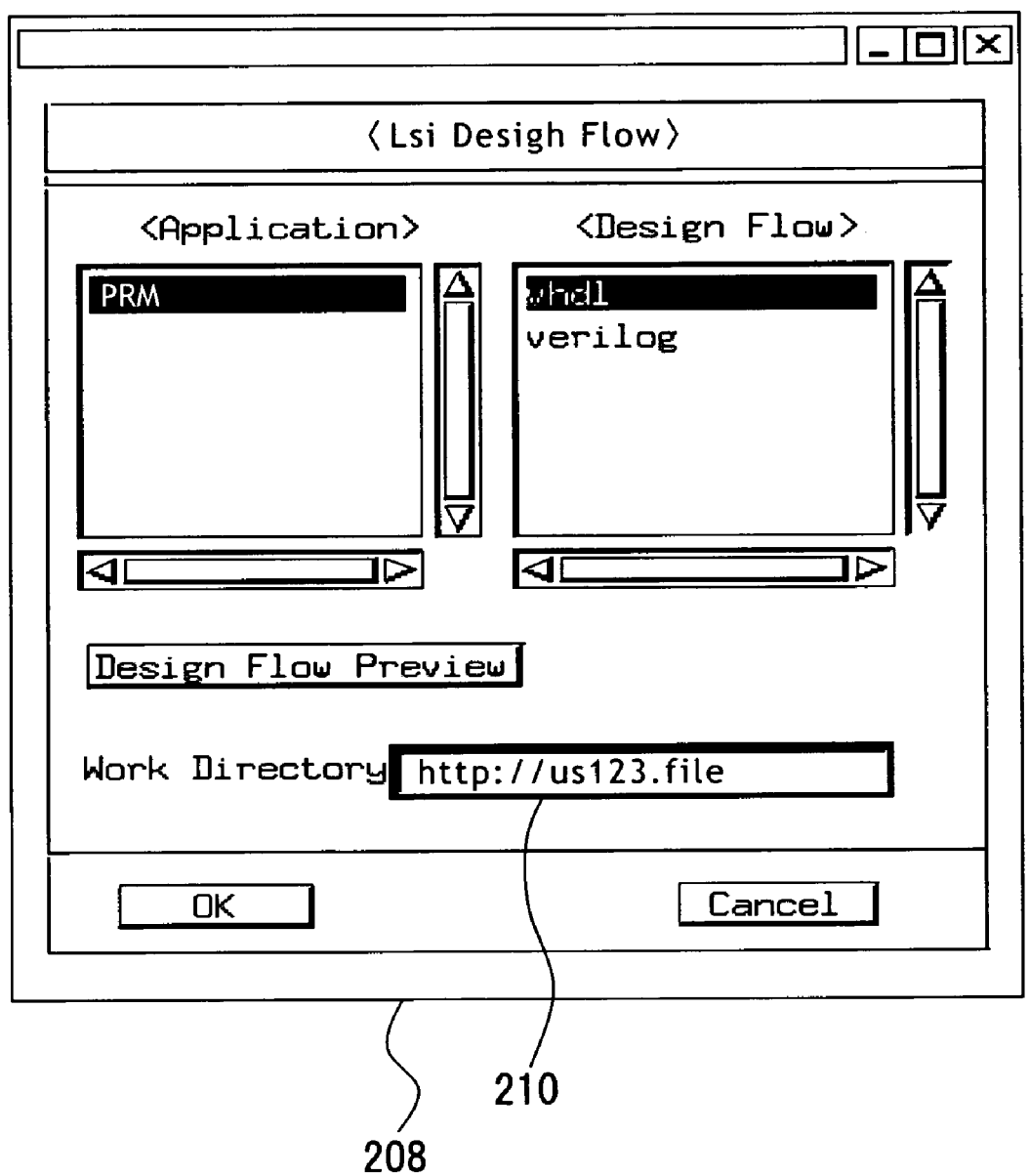
FIG. 32 is a diagram depicting a processing screen.

For a tool started up with a specific OS, the file is selected (step S4) and the tool is started (step S5). In short, as shown in (A) and (B) of FIG. 30, a particular file 204 is selected from a file selection display 202 to start it up. For example, as shown in FIG. 31, a startup screen 206 of the file 204 is displayed.

Figure 33:
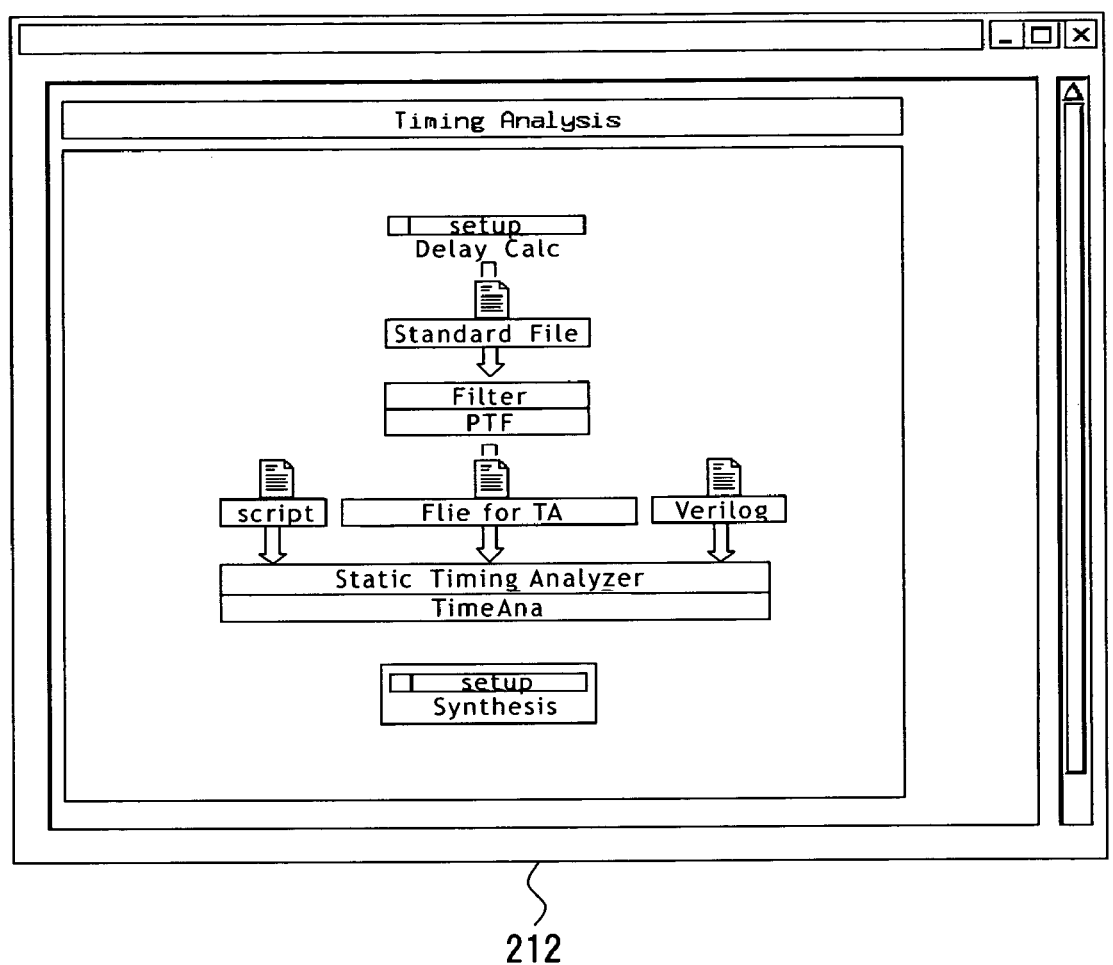
FIG. 33 is a diagram depicting a processing screen.

In this example of processing, a network file at a remote site is processed with a different OS (step S6). This processing is executed by performing network specification 210 on a network specification screen 208 shown in FIG. 32. As shown in FIG. 33, a tool startup display 212 is derived to execute tool startup for the particular OS to start up the tool. Consequently, various information processing resources at the remote site can be utilized.

Third Embodiment

Figure 34:
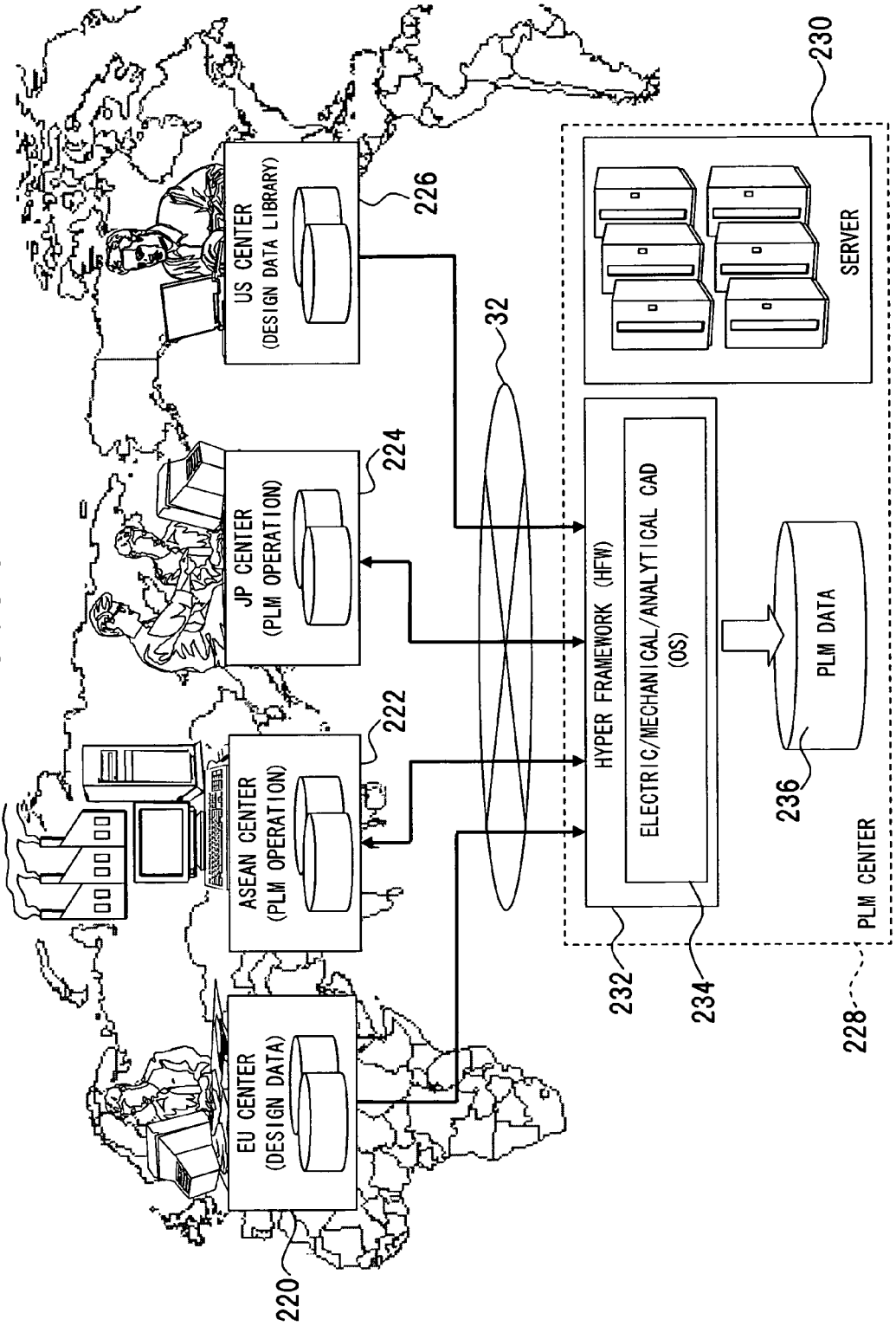
FIG. 34 schematically depicts a HFW according to a third embodiment of the present invention the present invention.

A third embodiment according to the present invention will now be described with reference to FIG. 34, which schematically depicts the HFW as one example of the present invention.

As described above, the present invention is mainly intended for efficient utilization of information processing resources existing at remote sites, such as other continents. In the following description, it is assumed that an EU center 220 resides as a plurality of bases in Europe, an ASEAN center 222 resides in Asia, a JP center 224 resides in Japan, and a US center 226 resides in the USA. It is also assumed that design data exists in the EU center 220, PLM operation is performed in the ASEAN center 222 and the JP center 224, and a design data library exists in the US center 226. A PLM center 228 is linked to the EU center 220, the ASEAN center 222, the JP center 224, and the US center 226. The PLM center 228 has a hyper framework (HFW) 232 set as ASP server processing in a server 230. For the HEW 232, an application 234, such as electricity/machine/analysis CAD, is executed. It is assumed that the application 234 is executed on various OS's including the commercially available ISV tool. In the HFW 232, for the execution of the application 234, data conversion processing by the use of the design data in the EU center 220 and the design data library in the US center 226 is performed. As a result, PLM data 236 is calculated. These centers 220, 222, 224, 226, and 228 correspond to the above-described information processing centers 301, 302, 303, 304, and 305.

For the transfer and utilization of information processing resources at other continents according to the above-described structure, ASP server processing (FIGS. 3, 4, 6, 7, 8, etc.) is performed centrally using transfer data from information processing centers and the PLM data 236, information processing resources distributed at remote sites can be utilized, and high-speed data transfer can be performed, as described above.

Fourth Embodiment

Figure 35:
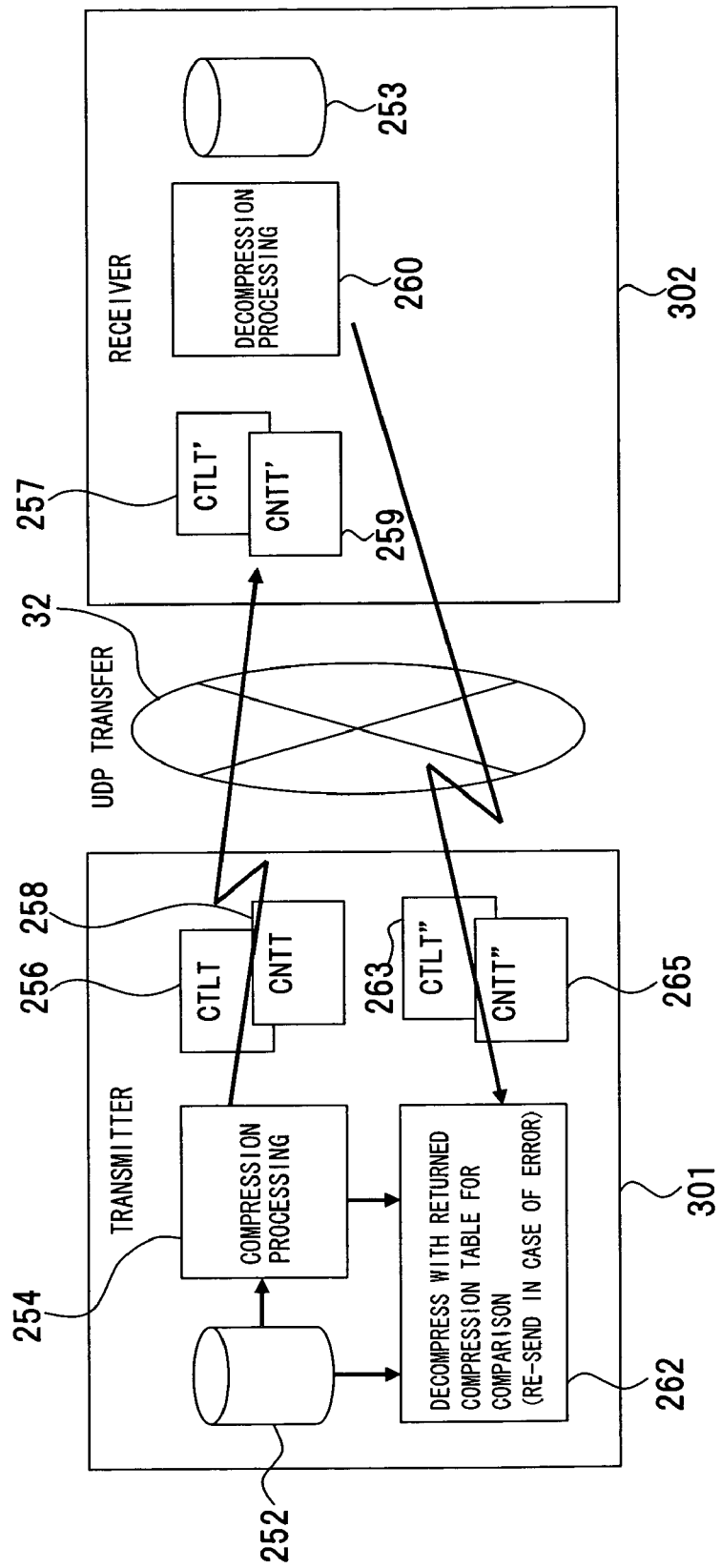
FIG. 35 a diagram depicting high-speed information transfer according to a fourth embodiment of the present invention.

A fourth embodiment according to the present invention will now be described with reference to FIGS. 35, 36, and 37. FIG. 35 is a diagram depicting high-speed information transfer. FIG. 36 is a diagram depicting an example of changed quantization bytes. FIG. 37 is a diagram depicting a control table and a compression result table.

According to this embodiment, as means for defining information processing resources to achieve high-speed transfer, quantization units of bits are changed to an optimal variable number of bytes and are expressed as the amount of change in transfer units (e.g., buffer size) to combine a method for decreasing the amount of transfer information for the overall (compression) processing in the transfer units with high-speed characteristics of the UDP transfer method. According to high-speed transfer in variable quantization bits, the amount of transfer information can be decreased and the transfer rate can be increased as such processing.

As for the origin of information processing systems, inputs and/or outputs are converted into a two-dimensional plane in order to conclude to human's visual (auditory) recognition. High-speed sequential processing is the basics of information processing, which needs to be ordered one dimensionally. On the interface, interconversion is continuously in progress. The digital signals are represented in values (quantization bits) of a certain number of steps. Actual transfer data has a structure for maintaining high accuracy, and is expressed in a larger number of bits than necessary, and consequently a larger amount of information than necessary is transferred. From a viewpoint of a similarity between before and after data with focus centered on the continuous uniformity of the data, visual data such as images exhibits a small variation, i.e., only several percent of the entire expressible information. In short, about 90% of the entire information is transferred meaninglessly.

A typical information processing system is processed in units of four bytes (e.g., one word is composed of 32 bits). From a byte-by-byte viewpoint, there is a high similarity between every pair of four bytes preceding and following a byte. From a viewpoint of certain units of data, data similarity is likely to be high in units of two dimensions (planes) if the data is image data. Based on these data similarities, a byte-by-byte data similarity in units of words, units of transfer buffers, units of planes for each application, etc. are acquired, and similar portions of data are expressed as differences for omission to reduce the amount of information and achieve high-speed information transfer.

For this purpose, quantization units of bits are changed to an optimal variable number of bytes and are expressed as the amount of change in transfer units (e.g., buffer size) to perform transfer in the units. This decreases the amount of overall transfer information.

Referring to FIG. 35, according to this embodiment, an information transmitter and an information receiver are assumed to be the information processing center 301 and the information processing center 302, respectively. In the information processing center 301, transfer data 252 is compressed in a compression processing section 254 to generate a control table (CTLT) 256 and a compression result table (CNTT) 258. This compression processing has been already described, and the CTLT 256 and the CNTT 258 are as shown in FIG. 37. The CTLT 256 and the CNTT 258 are transferred to the information processing center 302 via the network 32. This transfer is based on UDP.

In the information processing center 302, the received CTLT' 257 and the CNNT' 259 are decompressed into data 253 through decompression by a decompression processing section 260, and are sent to the information processing center 301. In the information processing center 301, transferred CNLT" 263 and CNTT" 265 are added to a data comparison section 262, and decompressed with the returned compression table for comparison. If a mismatch (e.g., difference) arises as a result of the comparison, the portion associated with the mismatch is resent. In the known TCP communication, for example, matching of all data is automatically performed, causing a delay due to checking at routers for long-range communication, which leads to slow data processing.

According to the above-described transfer based on variable quantization bytes, the data transfer rate can be improved.

As shown in the example of changed quantization bytes in FIG. 36, in compression processing by the compression processing section 254, information before transfer is expressed in bytes. In this example, through byte-by-byte reference to data in units of words, the number of subsequent duplicate bytes is recorded in the CTLT 256 as shown in (A) of FIG. 37. Subsequent different bytes remain as-is, and reference is made to the following word. Consequently, the CNTT 258 shown in (B) of FIG. 37 is generated as a result of compression processing. The amount of transferred data can be reduced for faster data transfer by sending the CTLT 256 and the CNTT 258 as the result of compression in transfer units (e.g., 1024 bytes) through this processing.

In this compression processing, the amount of transmission data and the compression ratio are as follows.

$$\text{Amount of transmission data} = \text{size of control table}(10B:2\times 5) + \text{size of compression data}(13B) = 23B \quad (1)$$

$$\text{Compression ratio} = 1 - 23 \text{(transmission)}/32 \text{(source data)} = 0.28 = 28\% \quad (2)$$

Simultaneous processing of data compression and high-speed transfer at the transmitter and data decompression at the receiver for each transmission buffer makes efficient the integrated processing system including long-range communication. This offers the advantage of high-speed long-range collaboration.

Although the most preferred embodiments of the present invention have been described hereinabove, it is to be appreciated that the present invention is not limited to the above description and that various changes and modifications will naturally occur to those skilled in the art without departing from the spirit and the scope of the invention defined in the appended claims or disclosed herein. Moreover, needless to say, such changes and modifications are encompassed in the scope of the present invention.

The entire disclosure of Japanese Patent Application No. 2004-382116 including specification, claims, drawings and summary are incorporated herein by reference in its entirety.

What is claimed is:

1. A high-speed information processing apparatus comprising:
   a conversion processing section that performs definition of an attribute for each of a plurality of distributed information processing resources by processing condition definition information, models the plurality of information processing resources based on data required for a processing, provided from a library and control data provided from a database, and assigns a collaborative relationship to the modeled information processing resources obtained through the modeling;
   a rewriting section that rewrites said modeled information processing resources into a form for high-speed transfer and stores the modeled information processing resources in a file so as to be able to transfer by replacing a basic library of basic software, which is accessed from an application program, with an intermediary library, and links the modeled information processing resources with a remote access driver by incorporating the remote access driver into the intermediary library, the remote access driver configured to send data to a destination in a unilateral way; and a transfer section that converts a quantization unit of bits of the information processing resources into an optimal variable number of bytes, expresses the quantization unit as an amount of change in transfer units, and reduces an amount of transfer information in overall processing in the transfer units for transfer, wherein the modeled information processing resources is transferred at a high rate of speed.

2. A high-speed information processing apparatus according to claim 1, wherein the definition includes modeling of basic components of the information processing resources and at least one of grouping, hierarchization, and parallelization of the modeled basic components.

3. A high-speed information processing apparatus according to claim 1, wherein the definition includes definition of processing operation of the modeled information processing resources and the definition of processing operation includes a condition and behavior of the processing operation.

4. A high-speed information processing apparatus according to claim 1, further comprising a transfer section that transfers the modeled information processing resources to another information processing apparatus.

5. A high-speed information processing apparatus according to claim 1, further comprising a display section that visually displays a processing state of the related information processing resources.

6. A high-speed information processing method comprising:

performing definition of an attribute for each of a plurality of distributed information processing resources by processing condition definition information, and modeling the plurality of information processing resources based on data required for a processing, provided from a library and control data provided from a database;

assigning a collaborative relationship to the modeled information processing resources obtained through the modeling;

rewriting said modeled information processing resources into a form for high-speed transfer and storing the modeled information processing resources in a file so as to be able to transfer by replacing a basic library of basic software, which is accessed from an application program, with an intermediary library, and linking the modeled information processing resources with a remote access driver by incorporating the remote access driver into the intermediary library, the remote access driver configured to send data to a destination in a unilateral way; and converting a quantization unit of bits of the information processing resources into an optimal variable number of bytes, expressing the quantization unit as an amount of change in transfer units, and reducing an amount of transfer information in overall processing in the transfer units for transfer, wherein the modeled information processing resources is transferred at a high rate of speed.

7. A high-speed information processing method according to claim 6, wherein the definition includes modeling of basic components of the information processing resources and at least one of grouping, hierarchization, and parallelization of the modeled basic components.

8. A high-speed information processing method according to claim 6, wherein the definition includes definition of processing operation of the modeled information processing resources and the definition of processing operation includes a condition and behavior of the processing operation.

9. A high-speed information processing method according to claim 6, further comprising transferring the modeled information processing resources to another information processing apparatus.

10. A high-speed information processing method according to claim 6, further comprising visualizing a processing state of the related information processing resources and converting the processing state into display information.

11. A high-speed information processing method according to claim 6, further comprising, if the information processing resources include processing information including three-dimensional event information, decreasing the amount of information based on the amount of change of the information over time.

12. A recording medium storing a computer-executable high-speed information processing program, the program causing a computer to execute operations comprising:

performing definition of an attribute for each of a plurality of distributed information processing resources by processing condition definition information, and modeling the plurality of information processing resources based on data required for a processing, provided from a library and control data provided from a database;

assigning a collaborative relationship to the modeled information processing resources obtained through the modeling;

rewriting said modeled information processing resources into a form for high-speed transfer and storing the modeled information processing resources in a file so as to be able to transfer by replacing a basic library of basic software, which is accessed from an application program, with an intermediary library, and linking the modeled information processing resources with a remote access driver by incorporating the remote access driver into the intermediary library, the remote access driver configured to send data to a destination in a unilateral way; and converting a quantization unit of bits of the information processing resources into an optimal variable number of bytes, expressing the quantization unit as an amount of change in transfer units, and reducing an amount of transfer information in overall processing in the transfer units for transfer, wherein the modeled information processing resources is transferred at a high rate of speed.

13. A recording medium according to claim 12, wherein the definition includes modeling of basic components of the information processing resources and at least one of grouping, hierarchization, and parallelization of the modeled basic components.

14. A recording medium according to claim 12, wherein the definition includes definition of processing operation of the modeled information processing resources and the definition of processing operation includes a condition and behavior of the processing operation.

15. A recording medium according to claim 12, wherein the high-speed information processing program further includes transferring the modeled information processing resources to another information processing apparatus.

16. An information processing method comprising:

defining an attribute for each of a plurality of distributed information processing resources and modeling the plurality of information processing resources based on processing data;

assigning a collaborative relationship to the modeled information processing resources obtained through the modeling;

linking the modeled information processing resources with a remote access driver;

rewriting said modeled information processing resources into a form for high speed transfer by replacing a basic library of basic software, which is accessed from an application program, with an intermediary library and incorporating the remote access driver into the intermediary library, the remote access driver configured to unilaterally send data to a destination; and converting a quantization unit of bits of the information processing resources into an optimal variable number of bytes, expressing the quantization unit as an amount of change in transfer units, and reducing an amount of transfer information in overall processing in the transfer units for transfer.

* * * * *